(12) United States Patent
Matono et al.

(10) Patent No.: US 7,359,152 B2
(45) Date of Patent: Apr. 15, 2008

(54) THIN FILM MAGNETIC HEAD STRUCTURE, METHOD OF MANUFACTURING THE SAME, AND METHOD OF MANUFACTURING THIN FILM MAGNETIC HEAD

(75) Inventors: Naoto Matono, Saku (JP); Osamu Fukuroi, Hong Kong (CN); Quan Bao Wang, Hong Kong (CN)

(73) Assignee: SAE Magnetics, (H.K.) Ltd., Hong Kong (CN)

( * ) Notice: Subject to any disclaimer, the term of this patent is extended or adjusted under 35 U.S.C. 154(b) by 446 days.

(21) Appl. No.: 11/206,102

(22) Filed: Aug. 18, 2005

(65) Prior Publication Data

US 2006/0044683 A1 Mar. 2, 2006

(30) Foreign Application Priority Data

Sep. 1, 2004 (JP) ............................. 2004-254666

(51) Int. Cl.
*G11B 5/147* (2006.01)
(52) U.S. Cl. ..................................... 360/126
(58) Field of Classification Search ................ 360/126, 360/327.32; 29/603.07
See application file for complete search history.

(56) References Cited

U.S. PATENT DOCUMENTS 6,076,252 A * 6/2000 Sasaki .................. 29/603.1
6,551,438 B1 * 4/2003 Tanemura ................ 156/265
6,687,976 B1 * 2/2004 Koyama et al. ......... 29/603.12

FOREIGN PATENT DOCUMENTS

JP          A 2-95572      4/1990
JP          A 11-000863    1/1999

* cited by examiner

Primary Examiner—Allen Cao
(74) Attorney, Agent, or Firm—Oliff & Berridge, PLC

(57) ABSTRACT

The present invention provides a method of manufacturing a thin film magnetic head in which MR height and neck height can be determined with high precision. A plurality of thin film magnetic head bars are formed so as to include a plurality of thin film magnetic head precursors, a plurality of RLG sensors for reproducing head portions, and a plurality of RLG sensors for recording head portions. While detecting electrical resistance values of resistance films by using the RLG sensors for the reproducing head portions, the thin film magnetic head bar is pre-polished. Electrical resistance values of the resistance films are detected by using both of the RLG sensors for the reproducing head portions and the RLG sensors for the recording head portions and a tilt of a polished surface of the thin film magnetic head bar is adjusted. After that, while detecting the electrical resistance values of the resistance films by using the RLG sensors for the reproducing head portions again, the thin film magnetic head bar is finish-polished, thereby forming an air bearing surface.

20 Claims, 22 Drawing Sheets

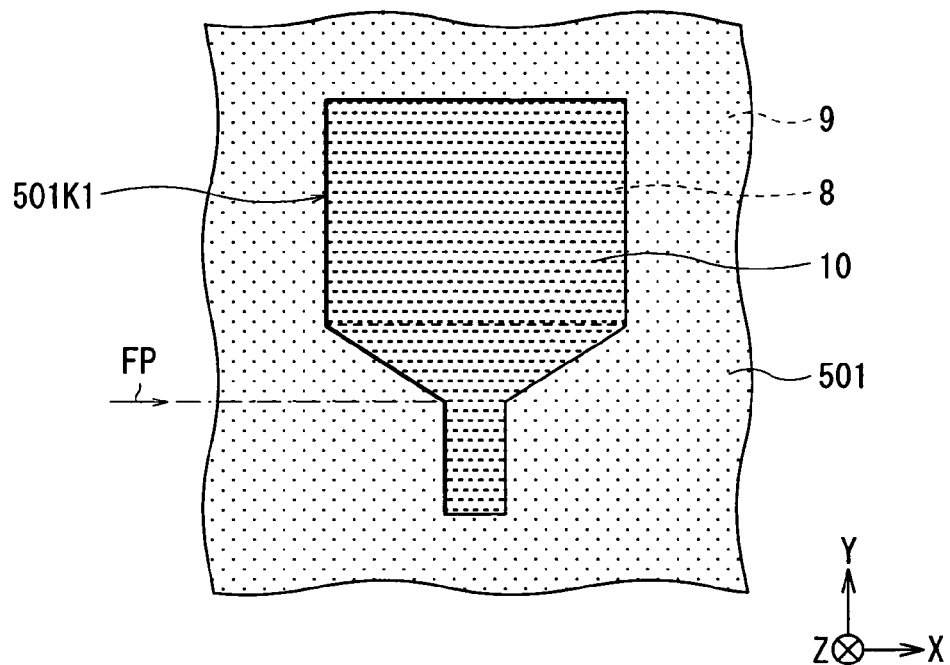
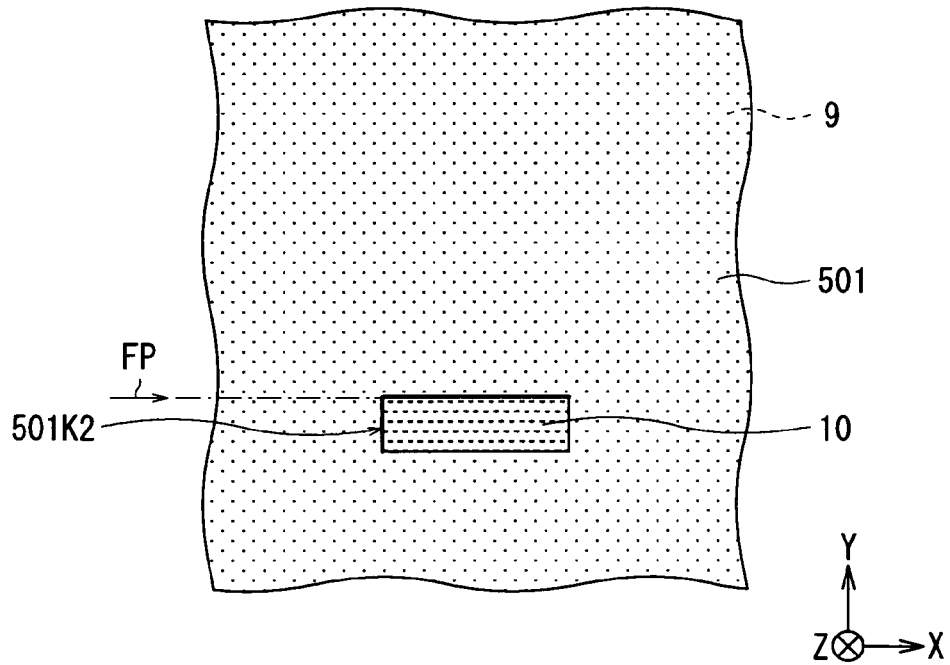

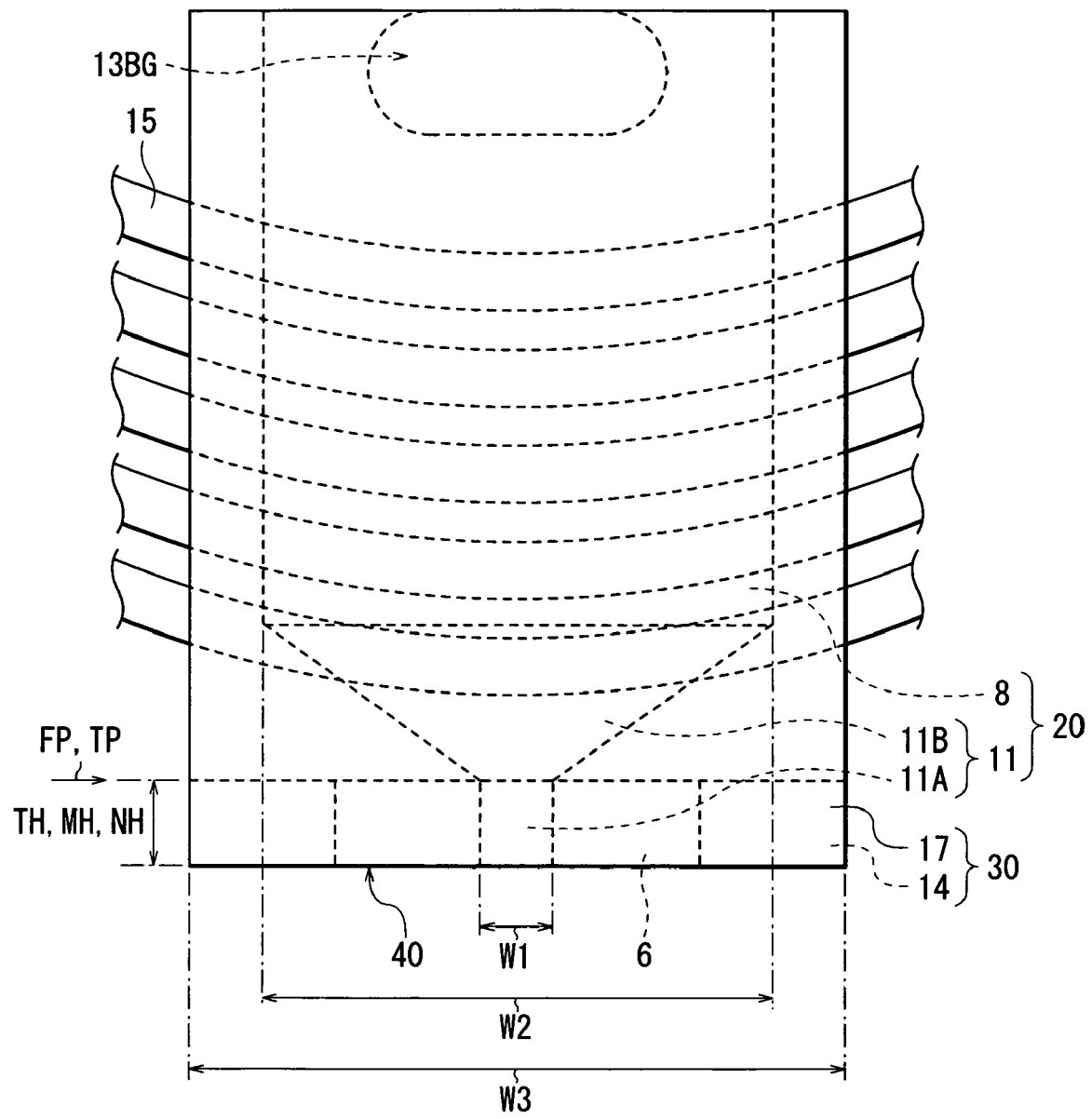
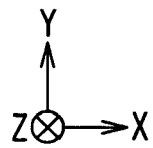
FIG. 21

THIN FILM MAGNETIC HEAD STRUCTURE, METHOD OF MANUFACTURING THE SAME, AND METHOD OF MANUFACTURING THIN FILM MAGNETIC HEAD

BACKGROUND OF THE INVENTION

1. Field of the Invention

The present invention relates to a thin film magnetic film head structure for manufacturing a thin film magnetic head having at least an inductive magnetic transducer for recording, a method of manufacturing the same, and a method of manufacturing a thin film magnetic head by using a thin film magnetic head structure.

2. Description of the Related Art

In recent years, as the areal density of a magnetic recording medium (hereinbelow, simply called "recording medium") such as a hard disk improves, improvement in performance of a thin film magnetic head which is mounted on a magnetic recording apparatus such as a hard disk drive (HDD) is demanded. Known recording methods of a thin film magnetic head are a longitudinal recording method in which the orientation of a signal magnetic field is set to an in-plane direction (longitudinal direction) of a recording medium and a perpendicular recording method in which the orientation of a signal magnetic field is set to a direction orthogonal to the surface of a recording medium. At present, the longitudinal recording method is widely used. However, when a market trend accompanying improvement in areal density of a recording medium is considered, it is assumed that, in place of the longitudinal recording method, the perpendicular recording method will be regarded as a promising method in future for the following reason. The perpendicular recording method has advantages such that high linear recording density can be assured and a recorded recording medium is not easily influenced by thermal decay.

A thin film magnetic head of the perpendicular recording method has a thin film coil for generating a magnetic flux and a magnetic pole layer extending rearward from an air bearing surface and emitting the magnetic flux generated by the thin film coil toward a recording medium. The magnetic pole layer includes, for example, a track width specifying part having a width (uniform width) specifying the recording track width of a recording medium. The height of the track width specifying part in the magnetic pole layer, that is, the distance from the front end (the edge exposed in the air bearing surface) of the track width specifying part to the rear end (the edge on the side far from the air bearing surface) is a neck height as an important factor contributing to recording performances of the thin film magnetic head. In the thin film magnetic head of the perpendicular recording method, when current is passed to a thin film coil and a magnetic flux for recording is generated, the magnetic flux is emitted from the tip of the track width specifying part of the magnetic pole layer, thereby generating a magnetic field for recording (perpendicular magnetic field), and the surface of the recording medium is magnetized on the basis of the perpendicular magnetic field. In such a manner, information is magnetically recorded on the recording medium.

As the thin film magnetic head, recently, a composite-type thin film magnetic head having not only the function of performing a recording process on a recording medium (magnetically recording information on a recording medium) but also the function of performing a reproducing process on the recording medium (magnetically reading the information recorded on the recording medium) (hereinbelow, simply called "composite thin film magnetic head") is spread. The composite thin film magnetic head has, for example, both of a recording head portion of executing a recording process of the perpendicular recording method and a reproducing head portion of executing a reproducing process by using the MR (Magneto-Resistive) effect. The reproducing head portion includes an MR device extending rearward from the air bearing surface as a main body of executing the reproducing process. The height of the MR device, specifically, the distance from the front end (the edge exposed in the air bearing surface) to the rear end (the edge on the side far from the air bearing surface) of the MR device is an MR height as an important factor contributing to reproduction performances of the thin film magnetic head.

To manufacture a plurality of composite thin film magnetic heads in a lump, composite thin film magnetic heads are manufactured by using a thin film magnetic head structure having a configuration that a plurality of thin film magnetic head precursor are provided on a wafer. The thin film magnetic head precursors are preparatory members to become thin film magnetic heads and are arranged in plural rows on a wafer. In particular, the thin film magnetic head precursor has a configuration similar to that of a completed composite thin film magnetic head including both of a reproducing head portion and a recording head portion, except that the air bearing surface is not formed.

In a process of manufacturing the composite thin film magnetic head, the thin film magnetic head structure is cut in rows of the thin film magnetic head precursors, thereby obtaining a plurality of thin film magnetic head bars. After that, one end face (a cut face of the thin film magnetic head structure) of the thin film magnetic head bar is polished so that the dimension of each of the polished reproducing head portion and the polished recording head portion becomes a predetermined dimension, concretely, the MR height of the reproducing head portion becomes a predetermined dimension and the neck height of the recording head portion becomes a predetermined dimension thereby forming an air bearing surface. It completes the thin film magnetic head. After that, the thin film magnetic head bar in which the air bearing surfaces are formed is cut in thin film magnetic heads, thereby obtaining a plurality of magnetic head sliders.

Some techniques have been already proposed with respect to the process of manufacturing a composite thin film magnetic head in order to control the progress of a polishing process in a polishing step for forming the air bearing surface. Concretely, for example, there is a known technique of forming a dummy sensor for monitoring in a thin film magnetic head precursor in a step of forming the thin film magnetic head preparatory sensor, and executing a polishing process while measuring the MR height by using the dummy sensor (refer to, for example, Japanese Unexamined Patent Application No. H11-000863). There is also a known technique of measuring electrical resistances of a plurality of MR devices in a plurality of thin film magnetic head precursors in place of measuring the MR height and executing the polishing process while calculating an average value of the electrical resistances (refer to, for example, Japanese Unexamined Patent Application No. H02-095572). In the techniques, the polishing amount can be controlled so that the MR height becomes a predetermined dimension.

To assure operation performance of the composite thin film magnetic head, it is necessary to determine, for example, both of the neck height contributing to the recording performance and the MR height contributing to the reproducing performance with high precision. In a conventional composite thin film magnetic head manufacturing method, however, at the time of polishing a thin film magnetic head bar, the progress of a polishing process is controlled so that MR height is determined to become a predetermined dimension among the plurality of thin film magnetic head precursors, but the progress of the polishing process is not controlled so that the neck height is determined to become a predetermined dimension among the plurality of thin film magnetic head precursors. Consequently, from the viewpoint of determining both of the MR height and the neck height with high precision, there is still room for improvement. Therefore, to assure the operation characteristics of the composite thin film magnetic head, it is desired to establish a technique of manufacturing a composite thin film magnetic head in which both of the MR height and the neck height can be determined with high precision in the polishing process for forming an air bearing surface. In this case, particularly, to establish the technique of manufacturing the composite thin film magnetic head, it is also important to establish a thin film magnetic head structure used for the manufacturing technique and a method of manufacturing the same.

SUMMARY OF THE INVENTION

The present invention has been achieved in consideration of such problems and its first object is to provide a thin film magnetic head structure capable of contributing to high-precision determination of both of the MR height and the neck height.

A second object of the invention is to provide a thin film magnetic head structure manufacturing method capable of easily manufacturing a thin film magnetic head structure.

A third object of the invention is to provide a thin film magnetic head manufacturing method capable of determining both of the MR height and the neck height with high precision.

A thin film magnetic head structure according to the invention includes, on one of surfaces of a substrate: a plurality of thin film magnetic head precursors each including both of a reproducing head portion and a recording head portion, as precursors to become a plurality of thin film magnetic heads each including both of the reproducing head portion and the recording head portion and having a recording-medium-facing surface which faces a recoding medium; a plurality of first resistance film patterns used to control progress of a polishing process on the reproducing head portion at the time of forming the thin film magnetic head by forming the recording-medium-facing surface by polishing the substrate together with the thin film magnetic head precursor; and a plurality of second resistance film patterns used to control progress of a polishing process on the recording head portion at the time of forming the thin film magnetic head by forming the recording-medium-facing surface by polishing the substrate together with the thin film magnetic head precursor.

A thin film magnetic head structure according to the invention includes, on one of surfaces of a substrate: a plurality of thin film magnetic head precursors as preparatory members to become a plurality of thin film magnetic heads; a plurality of first resistance film patterns used to control progress of a polishing process on the reproducing head portion at the time of forming the thin film magnetic head; and a plurality of second resistance film patterns used to control progress of a polishing process on the recording head portion at the time of forming the thin film magnetic head.

A method of manufacturing a thin film magnetic head structure according to the invention includes: a first step of forming a plurality of thin film magnetic head precursors each including both of a reproducing head portion and a recording head portion, as precursors to become a plurality of thin film magnetic heads each including both of the reproducing head portion and the recording head portion and having a recording-medium-facing surface which faces a recoding medium; a second step of forming a plurality of first resistance film patterns so as to be able to control progress of a polishing process on the reproducing head portion at the time of forming the thin film magnetic head by forming the recording-medium-facing surface by polishing a substrate together with the thin film magnetic head precursor; and a third step of forming a plurality of second resistance film patterns so as to be able to control progress of a polishing process on the recording head portion at the time of forming the thin film magnetic head by forming the recording-medium-facing surface by polishing the substrate together with the thin film magnetic head precursor. The plurality of thin film magnetic head precursors, the plurality of first resistance film patterns, and the plurality of second resistance film patterns are formed on one of surfaces of the substrate.

In the method of manufacturing a thin film magnetic head structure according to the invention, to manufacture the thin film magnetic head structure in which, on one of the surfaces of a substrate, a plurality of thin film magnetic head precursors as preparatory members to become thin film magnetic heads, a plurality of first resistance film patterns used to control the progress of the polishing process on the reproducing head portions at the time of forming the thin film magnetic heads, and a plurality of second resistance film patterns used to control the progress of the polishing process on the recording head portions at the time of forming the thin film magnetic heads are provided, only existing thin film processes are used and a novel and complicated manufacturing process is not used.

The invention provides a method of manufacturing a thin film magnetic head using the thin film magnetic head structure of the invention, including: a first step of cutting the thin film magnetic head structure along a direction of arrangement of a plurality of thin film magnetic head precursors, thereby forming a plurality of thin film magnetic head bars each including a plurality of thin film magnetic head precursors, a plurality of first resistance film patterns used to control progress of a polishing process on the reproducing head portion, and a plurality of second resistance film patterns used to control progress of a polishing process on the recording head portion; and a second step of forming the thin film magnetic head so as to have both of the reproducing head portion and the recording head portion and also a recording-medium-facing surface by forming the recording-medium-facing surface by polishing the thin film magnetic head precursor together with a substrate in the thin film magnetic head bar, while detecting a first electric resistance value between the first resistance film patterns or between the second resistance film patterns and a second electric resistance value between the first resistance film pattern and the second resistance film pattern, and controlling progress of the polishing process on the basis of the first and second resistance values.

In the thin film magnetic head manufacturing method according to the invention, the thin film magnetic head structure is cut along a direction of arrangement of a plurality of thin film magnetic head precursors, thereby forming a plurality of thin film magnetic head bars each including a plurality of thin film magnetic head precursors, a plurality of first resistance film patterns used to control progress of a polishing process on the reproducing head portion, and a plurality of second resistance film patterns used to control progress of a polishing process on the recording head portion. After that, the thin film magnetic head is formed by detecting a first electric resistance value between the first resistance film patterns or between the second resistance film patterns and a second electric resistance value between the first resistance film pattern and the second resistance film pattern, and forming the recording-medium-facing surface by polishing the thin film magnetic head precursor together with the substrate in the thin film magnetic head bar while controlling progress of the polishing process on the basis of the first and second resistance values. In this case, in a step of forming the recording-medium-facing surface by the polishing process, the progress of the polishing process on each of the reproducing head portion and the recording head portion is properly controlled. Consequently, the MR height of the reproducing head portion reaches the target dimension, and the neck height of the recording head portion reaches the target dimension.

In the thin film magnetic head structure and the method of manufacturing the same according to the invention, the first resistance film pattern is used to grasp a polishing amount of the reproducing head portion on the basis of a change in its electrical resistance which changes according to the polishing amount, and the second resistance film pattern is used to grasp a polishing amount of the recording head portion on the basis of a change in its electrical resistance which changes according to the polishing amount. In this case, the plurality of thin film magnetic head precursors may be arranged in a plurality of rows, and the plurality of first resistance film patterns and the plurality of second resistance film patterns may be arranged in a plurality of rows in correspondence with the arrangement direction of the plurality of thin film magnetic head precursors.

In the thin film magnetic head structure and the method of manufacturing the same according to the invention, the thin film magnetic head precursors may be disposed in a first region in one of the surfaces of the substrate, and the first and second resistance film patterns may be disposed in a second region different from the first region in one of the surfaces of the substrate. In this case, the reproducing head portion may have a stacked structure including a magneto-resistive effect device extending rearward from the recording-medium-facing surface and executing a reproducing process, the recording head portion may have a stacked structure including a magnetic pole layer extending rearward from the recording-medium-facing surface, having a track width specifying part which specifies a recording track width of the recording medium, and executing a recording process. The first resistance film pattern may be disposed in the same level as that of the magneto-resistive effect device in the reproducing head portion, and the second resistance film pattern may be disposed in the same level as that of the magnetic pole layer in the recording head portion. The first resistance film pattern is used to grasp a polishing amount of the reproducing head portion so that the dimension of the magneto-resistive effect device in the extension direction of the magneto-resistive effect device becomes a predetermined dimension, and the second resistance film pattern is used to grasp a polishing amount of the recording head portion so that the dimension of the track width specifying part in the extension direction of the magnetic pole layer becomes a predetermined dimension. In this case, the first resistance film pattern may be formed in parallel with the magneto-resistive effect device, and the second resistance film pattern may be formed in parallel with the magnetic pole layer.

In the thin film magnetic head structure according to the invention, the magnetic pole layer may be constructed to emit a magnetic flux for magnetizing the recording medium in a direction orthogonal to the surface of the recording medium. In the method of manufacturing a thin film magnetic head structure according to the invention, the third step may include the steps of: forming a seed layer for making a plating film grown; pattern-forming the magnetic pole layer and forming a dummy pattern for forming the second resistance film pattern by making a plating film selectively grown on the seed layer; selectively etching and removing the seed layer by using both of the magnetic pole layer and the dummy pattern as a mask, thereby making the seed layer remain only in regions corresponding to the shapes of the magnetic pole layer and the dummy pattern; and removing the dummy pattern, thereby using the seed layer remaining in the region corresponding to the shape of the dummy pattern as the second resistance film pattern.

In the method of manufacturing a thin film magnetic head according to the invention, preferably, in the second step, the thin film magnetic head bar is polished while grasping the polishing amount on the basis of a change in each of the first electric resistance value and the second electric resistance value according to the polishing amount. Concretely, in the first step, the thin film magnetic head precursor in which the reproducing head portion has a stacked structure including a magneto-resistive effect device extending rearward from the recording-medium-facing surface and executing a reproducing process, and the recording head portion has a stacked structure including a magnetic pole layer extending rearward from the recording-medium-facing surface, having a track width specifying part which specifies a recording track width of the recording medium, and executing a recording process is used. In the second step, on the basis of the first and second electrical resistance values, the reproducing head portion is polished so that the dimension of a magneto-resistive effect device in the extension direction of the magneto-resistive effect device becomes a predetermined dimension, and the recording head portion is polished so that the dimension of the track width specifying part in the extension direction of the magnetic pole layer becomes a predetermined dimension. In this case, the second step may include the steps of pre-polishing the thin film magnetic head bar so that the dimension of a magneto-resistive effect device in the extension direction of the magneto-resistive effect device becomes a pre-dimension larger than a target dimension on the basis of the first electrical resistance value; adjusting a tilt of a polished surface of the thin film magnetic head bar while maintaining the pre-dimension on the basis of the first and second electrical resistance values; and finish-polishing the thin film magnetic head bar so that the dimension of the magneto-resistive effect device in the extension direction of the magneto-resistive effect device becomes the target dimension from the pre-dimension on the basis of the first electrical resistance value.

In the thin film magnetic head structure according to the invention, a thin film magnetic head is manufactured by using a thin film magnetic head structure on the basis of the structural characteristic that the thin film magnetic head structure includes, on one of surfaces of a substrate: a plurality of thin film magnetic head precursors as preparatory members to become a plurality of thin film magnetic heads; a plurality of first resistance film patterns used to control progress of a polishing process on the reproducing head portion at the time of forming the thin film magnetic head; and a plurality of second resistance film patterns used to control progress of a polishing process on the recording head portion at the time of forming the thin film magnetic head. Therefore, the invention can contribute to high-precision determination of the MR height and the neck height.

In the method of manufacturing a thin film magnetic head structure according to the invention, to manufacture the thin film magnetic head structure in which, on one of the surfaces of a substrate, a plurality of thin film magnetic head precursors as preparatory members to become thin film magnetic heads, a plurality of first resistance film patterns used to control the progress of the polishing process on the reproducing head portions at the time of forming the thin film magnetic heads, and a plurality of second resistance film patterns used to control the progress of the polishing process on the recording head portions at the time of forming the thin film magnetic heads are provided, only existing thin film processes are used and a novel and complicated manufacturing process is not used. On the basis of the manufacture characteristic, the thin film magnetic head structure can be easily manufactured by using only the existing thin film processes.

Further, in the thin film magnetic head manufacturing method according to the invention, the thin film magnetic head structure is cut along a direction of arrangement of a plurality of thin film magnetic head precursors, thereby forming a plurality of thin film magnetic head bars each including a plurality of thin film magnetic head precursors, a plurality of first resistance film patterns used to control progress of a polishing process on the reproducing head portion, and a plurality of second resistance film patterns used to control progress of a polishing process on the recording head portion. After that, the thin film magnetic head is formed by detecting a first electric resistance value between the first resistance film patterns or between the second resistance film patterns and a second electric resistance value between the first resistance film pattern and the second resistance film pattern, and forming the recording-medium-facing surface by polishing the thin film magnetic head precursor together with the substrate in the thin film magnetic head bar while controlling progress of the polishing process on the basis of the first and second resistance values. On the basis of the manufacture characteristic, in a step of forming the recording-medium-facing surface by the polishing process, the progress of the polishing process on each of the reproducing head portion and the recording head portion is properly controlled. Consequently, the MR height and the neck height can be determined with high precision.

Other and further objects, features and advantages of the invention will appear more fully from the following description.

BRIEF DESCRIPTION OF THE DRAWINGS

FIGS. 8A and 8B are plan views illustrating a process subsequent to the process shown in FIGS. 7A and 7B.

FIG. 21 is a plan view showing a configuration (configuration seen from above in the Z-axis direction) of the thin film magnetic head illustrated in FIG. 20.

DETAILED DESCRIPTION OF THE PREFERRED EMBODIMENTS

Embodiments of the invention will now be described in detail hereinbelow with reference to the drawings.

Figure 1:
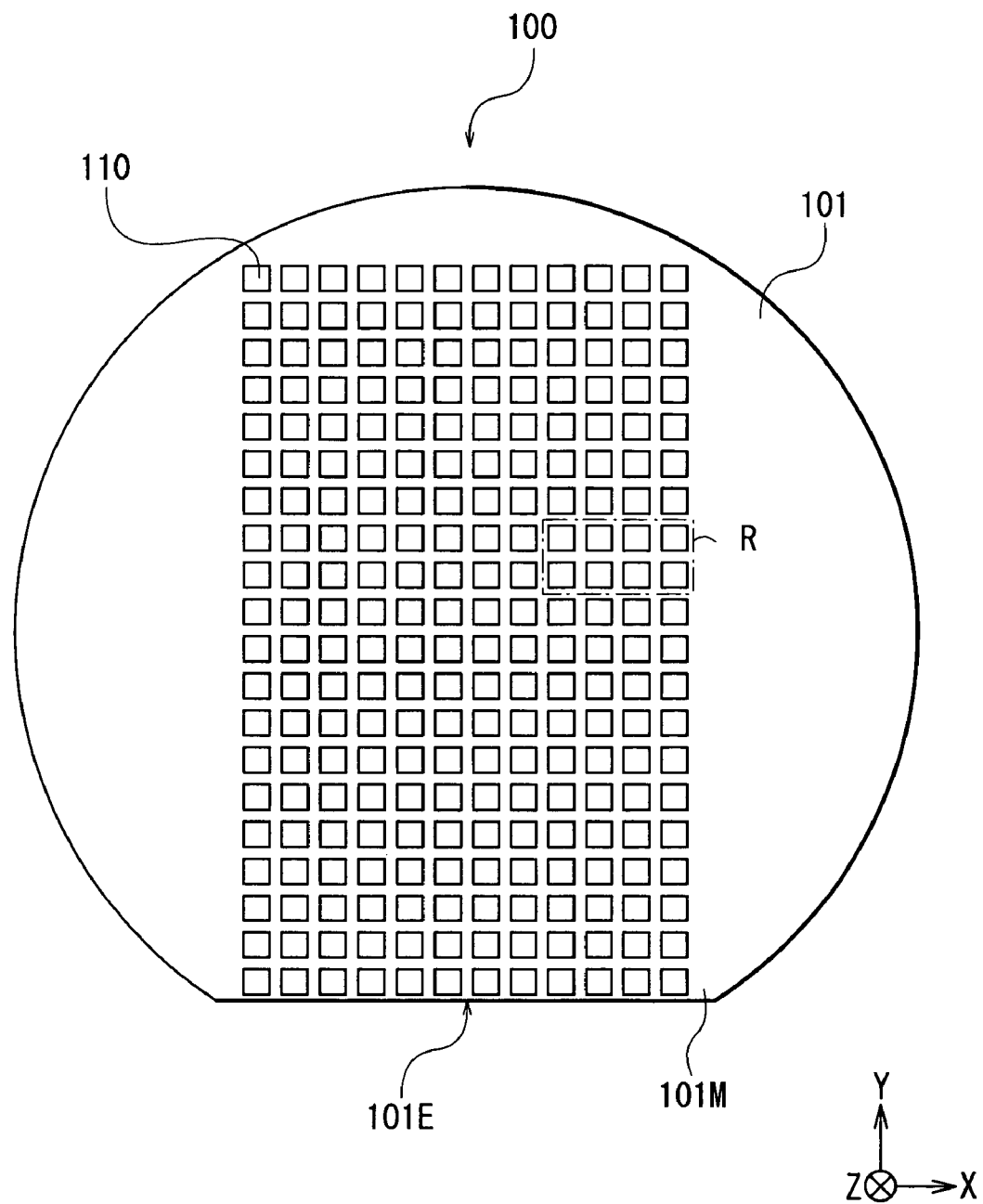
FIG. 1 is a plan view showing a configuration (configuration seen from above in the Z-axis direction) of a thin film magnetic head structure according to an embodiment of the invention.

First, the configuration of a thin film magnetic head structure according to an embodiment of the invention will be described with reference to FIG. 1. FIG. 1 is a plan view showing a configuration (configuration seen from above in the Z-axis direction) of a thin film magnetic head structure 100.

In the following description, the dimension in the X-axis direction shown in FIG. 1 will be described as "width", the dimension in the Y-axis direction will be described as "height or length", and the dimension in the Z-axis direction will be described as "thickness". The side closer to the air bearing surface in the Y-axis direction will be described as "front side" and the side opposite to the front side will be described as "back side". The description will be similarly used in FIG. 2 and subsequent drawings.

The thin film magnetic head structure 100 of the embodiment is used for manufacturing a thin film magnetic head to be mounted on a magnetic recording apparatus such as a hard disk drive (HDD). More concretely, the thin film magnetic structure 100 is used to manufacture a plurality of composite thin film magnetic heads each including both of a reproducing head portion and a recording head portion and having a recording-medium-facing surface (air bearing surface) facing a magnetic recording medium (hereinbelow, simply called "recording medium") such as a hard disk.

The thin film magnetic head structure 100 has, for example, as shown in FIG. 1, a configuration including a plurality of thin film magnetic head precursors 110 each including a reproducing head portion and a recording head portion as members to become thin film magnetic heads on one surface (device forming surface 101M) of a wafer 101. In particular, the thin film magnetic head structure 100 has, on the device formation surface 101M of the wafer 101, not only the plurality of thin film magnetic head precursors 110 but also two kinds of RLG (Resistance Lapping Guide) sensors (an RLG sensor 200 for the reproducing head portion and an RLG sensor 300 for the recording head portion; refer to FIG. 2) and an M sensor 400 (refer to FIG. 3) which will be described later. In FIG. 1, the plurality of thin film magnetic head precursors 110 are schematically shown.

The wafer 101 is a substrate for supporting the plurality of thin film magnetic head precursors 110 and is made of, for example, a ceramic material such as AlTiC ($Al_2O_3 \cdot TiC$). The wafer 101 has an almost disc-shaped structure having a flat portion used for position recognition (orientation flat 101E) in part of circumference thereof.

The thin film magnetic head precursors 110 are preparatory members to become thin film magnetic heads as described above and are arranged in plurality of rows on the device formation surface 101M of the wafer 101. Concretely, the thin film magnetic head precursors 110 are arranged in a matrix along the orientation flat 101E so that the portion in which the thin film magnetic head precursors 110 are provided in the wafer 101 can be efficiently diced at the time of dicing the wafer 101 (refer to FIG. 14) in a thin film magnetic head manufacturing method which will be described later. FIG. 1 shows an example in which the plurality of thin film magnetic head precursors 110 are arranged in 12 columns and 20 rows on the device formation surface 101M of the wafer 101. The "row" denotes a sequence of the thin film magnetic head precursors 110 in the horizontal direction (X-axis direction) and the "column" denotes a sequence of the thin film magnetic head precursors 110 in the vertical direction (Y-axis direction). The arrangement of the thin film magnetic head precursors 110 is not always limited to 12 columns by 20 rows but can be freely changed.

Figure 2:
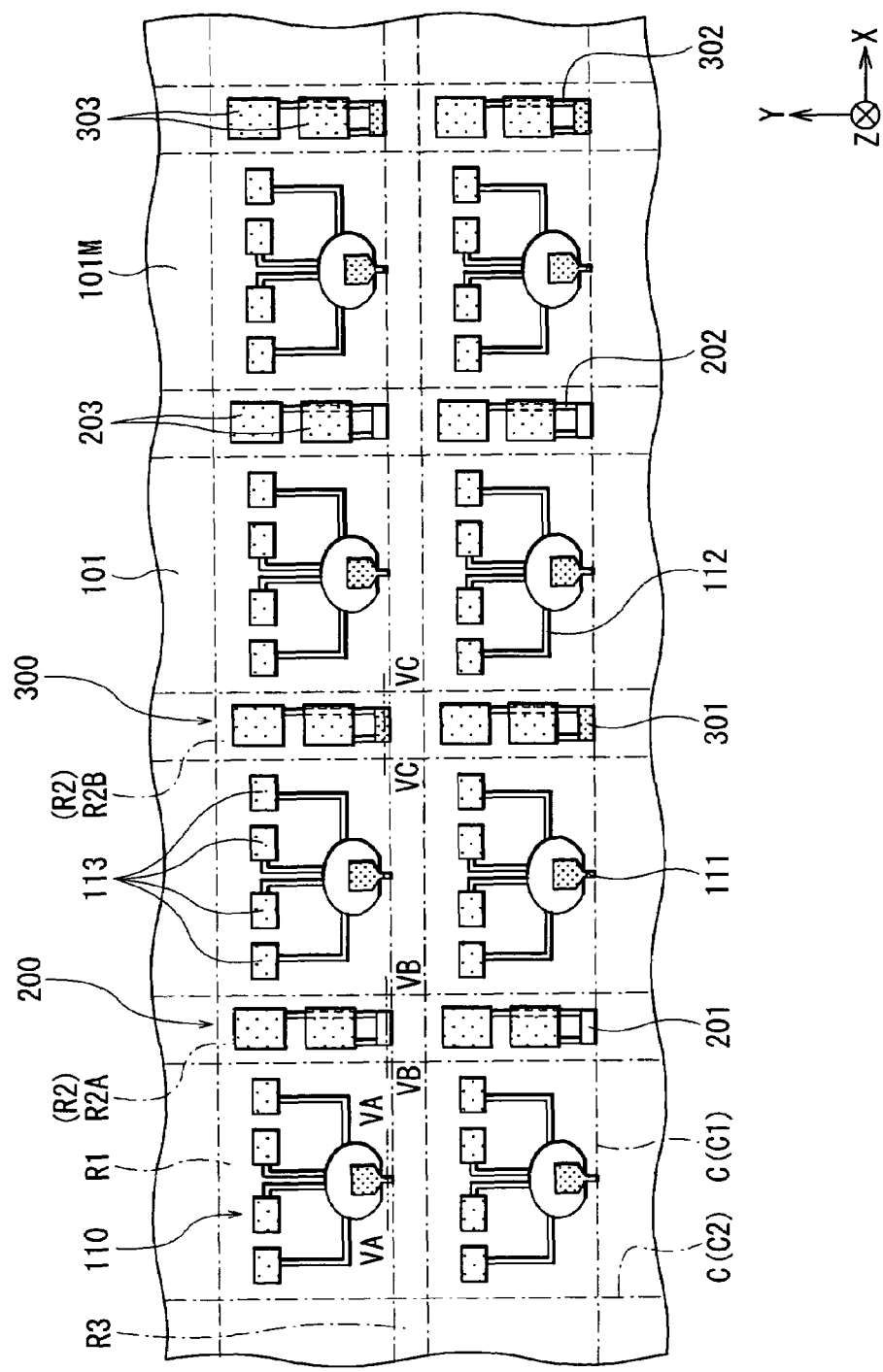
FIG. 2 is a plan view enlargedly showing a partial area of the configuration of the thin film magnetic head structure illustrated in FIG. 1.
Figure 3:
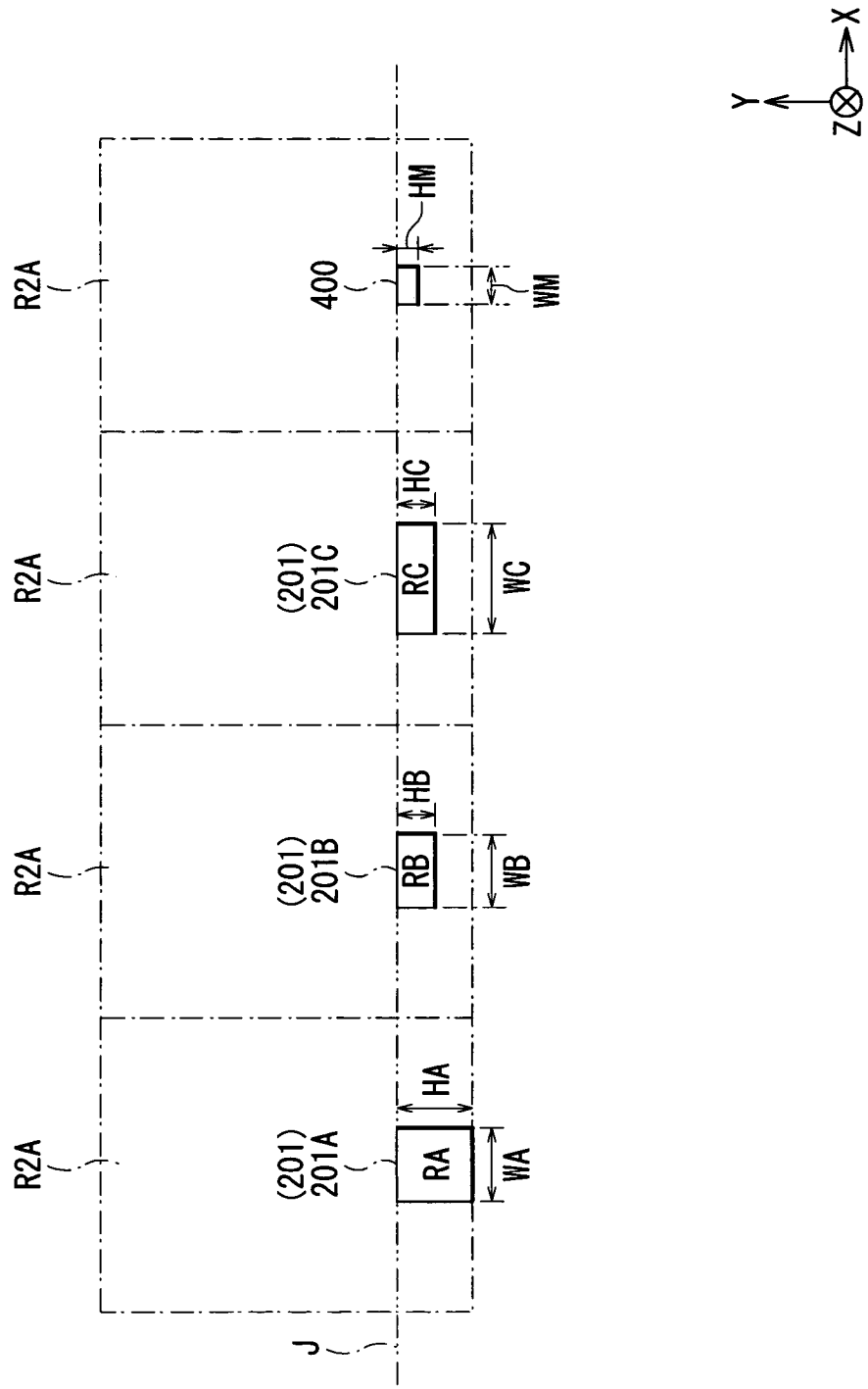
FIG. 3 is a plan view schematically showing only a partial area of the configuration of the thin film magnetic head structure illustrated in FIG. 2.

Next, the detailed configuration of the thin film magnetic head structure 100 will be described with reference to FIGS. 1 to 3. FIG. 2 is a plan view enlargedly showing a partial region (a region R) of the configuration of the thin film magnetic head structure 100 illustrated in FIG. 1. FIG. 3 is a plan view schematically showing only a partial region (only a region R2A) of the configuration of the thin film magnetic head structure 100 illustrated in FIG. 2. Alternate long and short dash lines shown in FIG. 2 are imaginary lines (cut lines C) along which the wafer 101 is diced at the time of manufacturing thin film magnetic heads by using the thin film magnetic head structure 100. In FIG. 2, lines extending in the horizontal direction (X-axis direction) are shown as cut lines C1, and lines extending in the vertical direction (Y-axis direction) are shown as cut lines C2.

In the region R in the thin film magnetic head structure 100 shown in FIG. 1, for example, as shown in FIG. 2, four thin film magnetic head precursors 110 are arranged in the X-axis direction in one of rows (in this case, upper row) and, similarly, four thin film magnetic head precursors 110 are arranged in the X-axis direction in the other row (in this case, lower row). Concretely, in the two rows, the thin film magnetic head precursors 110 are arranged in regions R1 (first regions) repeatedly provided at predetermined intervals (regions R2) in the X-axis direction.

In regions between the neighboring thin film magnetic head precursors 110, that is, in the regions R2 (second regions) provided between neighboring regions R1, for example, as shown in FIG. 2, the plurality of RLG sensors 200 for the reproducing head portions and the plurality of RLG sensors 300 for the recording head portions are provided. The RLG sensors 200 for the reproducing head portions and RLG sensors 300 for the recording head portions are used for controlling the progress of a polishing process at the time of forming thin film magnetic heads by using the thin film magnetic head structure 100, more concretely, at the time of forming thin film magnetic heads by forming air bearing surfaces by polishing the thin film magnetic head precursors 110 together with the wafer 101. The RLG sensors 200 for the reproducing head portions and the RLG sensors 300 for the recording head portions are arranged in a plurality of columns in correspondence with the arrangement direction of the thin film magnetic head precursors 110, that is, arranged repeatedly in the X-axis direction in a manner similar to the thin film magnetic head precursors 110. Concretely, the RLG sensors 200 for the reproducing head portions and the RLG sensors 300 for the recording head portions are, for example, alternately disposed in the region R2. More specifically, the RLG sensors 200 for the reproducing head portions are disposed in the every other regions R2A, and the RLG sensors 300 for the recording head portions are disposed in every other regions R2B except the regions R2A.

In particular, in a specific region R2A which is set every predetermined number of regions R2A in the series of regions R2A in which the RLG sensors 200 for the reproducing head portions are provided, for example, as shown in FIG. 3, the M sensor 400 used for grasping electric resistance of the main part (an MR device 6 which will be described later in FIGS. 4 to 6) of the thin film magnetic head precursor 110 is provided. In other words, part of the plurality of RLG sensors 200 for the reproducing head portions provided in the series of regions R2A is replaced with the M sensors 400. FIG. 3 shows the case where, for example, the M sensors 400 are disposed in the specific regions R2A which are provided at intervals of three regions R2A in the series of regions R2A. That is, combinations each having three resistance films 201 (201A, 201B, and 201C) which will be described later and the M sensor 400 are repeatedly provided in the regions R2A. An example of the dimensions of the resistance films 201A to 201C is as follows. The resistance film 201A has a width WA=20 μm and a height HA=20 μm, the resistance film 201B has a width WB (=WA)=20 μm and a height HB (=HA−10 μm)=10 μm, and the resistance film 201C has a width WC (=WA+10 μm)=30 μm and a height HC (=HA−10 μm)=10 μm.

The regions other than the regions R1 and R2 (R2A and R2B) shown in FIG. 2, that is, regions R3 in which none of the thin film magnetic head precursors 110, RLG sensors 200 for the reproducing head portions, the RLG sensors 300 for the recording head portions, and the M sensors 400 is provided are redundant spaces which are disposed as redundant portions when the wafer 101 is diced along the cut lines C1 to manufacture thin film magnetic heads by using the thin film magnetic head structure 100.

The thin film magnetic head precursor 110 includes, for example, as shown in FIG. 2, a stacked structure 111 as a preparatory structure of a substantial thin film magnetic head and electrode pads 113 electrically connected to the stacked structure 111 via wiring patterns 112. FIG. 2 shows the case where, for example, four electrode pads 113 are connected to the stacked structure 111 via four wiring patterns 112. The number of wiring patterns 112, the number of electrode pads 113, and the configurations (such as positions and shapes) of the wiring pattern 112 and the electrode pad 113 are not always limited to the above but can be freely changed. In the thin film magnetic head precursor 110, the stacked structure 111 is positioned in such a manner that the main part (an MR device 6 and a magnetic pole layer 20 which will be described later; refer to FIGS. 4 to 6) of the stacked structure 111 is adjacent to the region R3 in the region R1 so that the main part is exposed in the cut surface (a cut surface 101K1 which will be described later; refer to FIG. 14) when the wafer 101 is diced along the cut lines C1 in the thin film magnetic head manufacturing process.

The RLG sensor 200 for the reproducing head portion is used to control progress of a polishing process on the reproducing head portion at the time of forming a thin film magnetic head by using the thin film magnetic head structure 100, more concretely, at the time of forming a thin film magnetic head by forming an air bearing surface by polishing the thin film magnetic head precursor 110 together with the wafer 101. In particular, different from the RLG sensor 300 for the recording head portion used as an auxiliary sensor for adjusting an inclination of a polishing surface as will be described later, the RLG sensor 200 for the reproducing head portion is used as a main sensor for substantially adjusting a polishing amount to control the progress of the polishing process at the time of forming a thin film magnetic head by performing the polishing process on the thin film magnetic head precursor 110. The RLG sensor 200 for the reproducing head portion includes, for example, as shown in FIG. 2, a resistance film 201 as a substantial sensor part and an electrode pad 203 electrically connected to the resistance film 201 via a wiring pattern 202. The resistance film 201 is a first resistance film pattern used to grasp the polishing amount of the reproducing head portion on the basis of a change in electric resistance which occurs according the polishing amount (a change in the dimensions of the resistance film 201 accompanying a polishing process). FIG. 2 shows the case where two electrode pads 203 are connected to the resistance film 201 via the two wiring patterns 202. The number of wiring patterns 202, the number of electrode pads 203, and the configurations (such as positions and shapes) of the wiring pattern 202 and the electrode pad 203 are not always limited to the above but can be freely changed. In the RLG sensor 200 for the reproducing head portion, the resistance film 201 is positioned in such a manner that its one end is adjacent to the region R3 in the region R2A so that the resistance film 201 is exposed in a cut surface when the wafer 101 is diced along the cut lines C1 in the thin film magnetic head manufacturing process.

The RLG sensor 300 for the recording head portion is used to control progress of a polishing process on the recording head portion at the time of forming a thin film magnetic head by using the thin film magnetic head structure 100, more concretely, at the time of forming a thin film magnetic head by forming an air bearing surface by polishing the thin film magnetic head precursor 110 together with the wafer 101. The RLG sensor 300 for the recording head portion has a configuration similar to that of the RLG sensor 200 for the reproducing head portion as shown in FIG. 2, that is, includes a resistance film 301 as a substantial sensor part and an electrode pad 303 electrically connected to the resistance film 301 via a wiring pattern 302. The resistance film 301 is a second resistance film pattern used to grasp the polishing amount of the recording head portion on the basis of a change in electric resistance which occurs according the polishing amount (a change in the dimensions of the resistance film 301 accompanying a polishing process). FIG. 2 shows the case where, in a manner similar to the RLG sensor 200 for the reproducing head portion, two electrode pads 303 are connected to the resistance film 301 via the two wiring patterns 302. The number of wiring patterns 302, the number of electrode pads 303, and the configurations (such as positions and shapes) of the wiring pattern 302 and the electrode pad 303 are not always limited to the above but can be freely changed. In the RLG sensor 300 for the recording head portion, in a manner similar to the RLG sensor 200 for the reproducing head portion, the resistance film 301 is positioned in such a manner that its one end is adjacent to the region R3 in the region R2B so that the resistance film 301 is exposed in a cut surface when the wafer 101 is diced along the cut lines C1 in the thin film magnetic head manufacturing process.

The M sensor 400 is used, as described above, to grasp electric resistance of the main part (the MR device 6 which will be described later; refer to FIGS. 4 to 6) of the stacked structure 111 at the time of forming a thin film magnetic head by using the thin film magnetic head structure 100. The width WM and the height HM of the M sensor 400 are set so as to be similar to the dimensions of the MR device 6. As shown in FIG. 3, the resistance films 201A to 201C and the M sensor 400 are positioned so that the edge (upper end shown in FIG. 3) on the side opposite to the side where the air bearing surface is formed in the thin film magnetic head manufacturing process is along an imaginary line (reference line J) parallel to the X axis.

Figure 4:
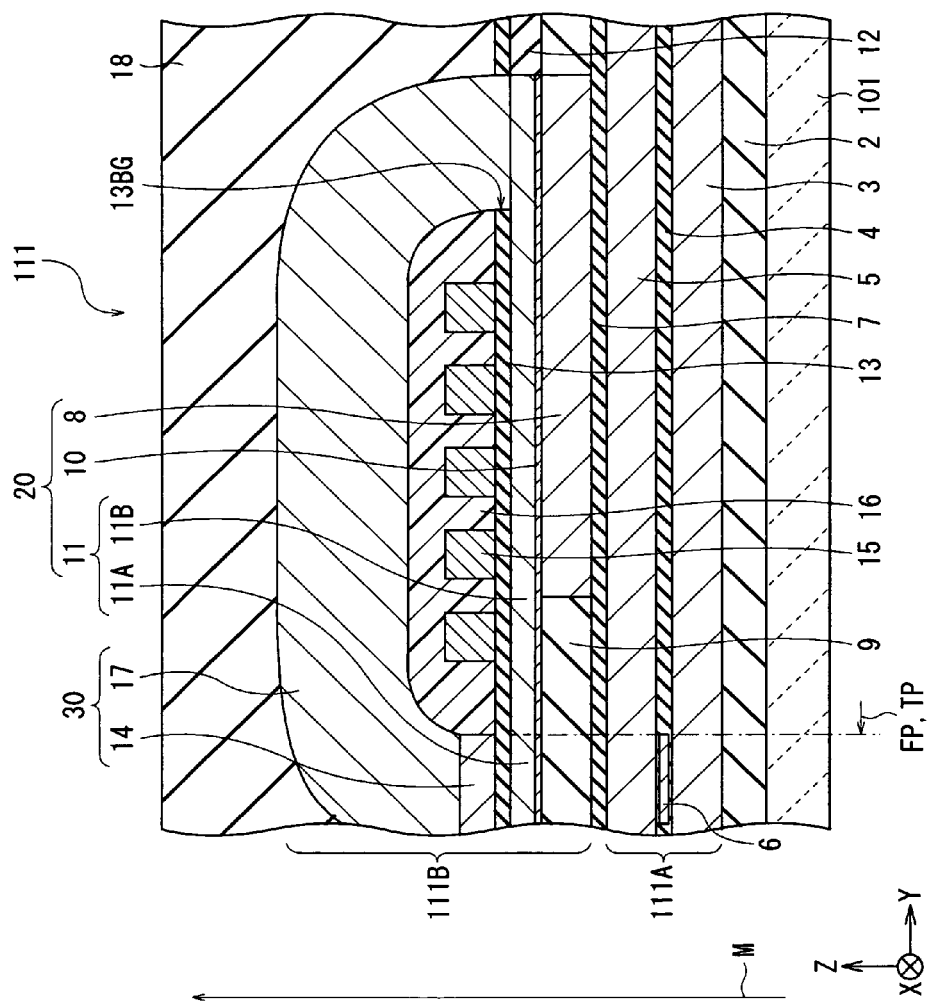
FIG. 4 is a cross section showing a sectional configuration (sectional configuration parallel to a YZ plane) of a stacked structure in the thin film magnetic head structure illustrated in FIG. 1.
Figure 5:
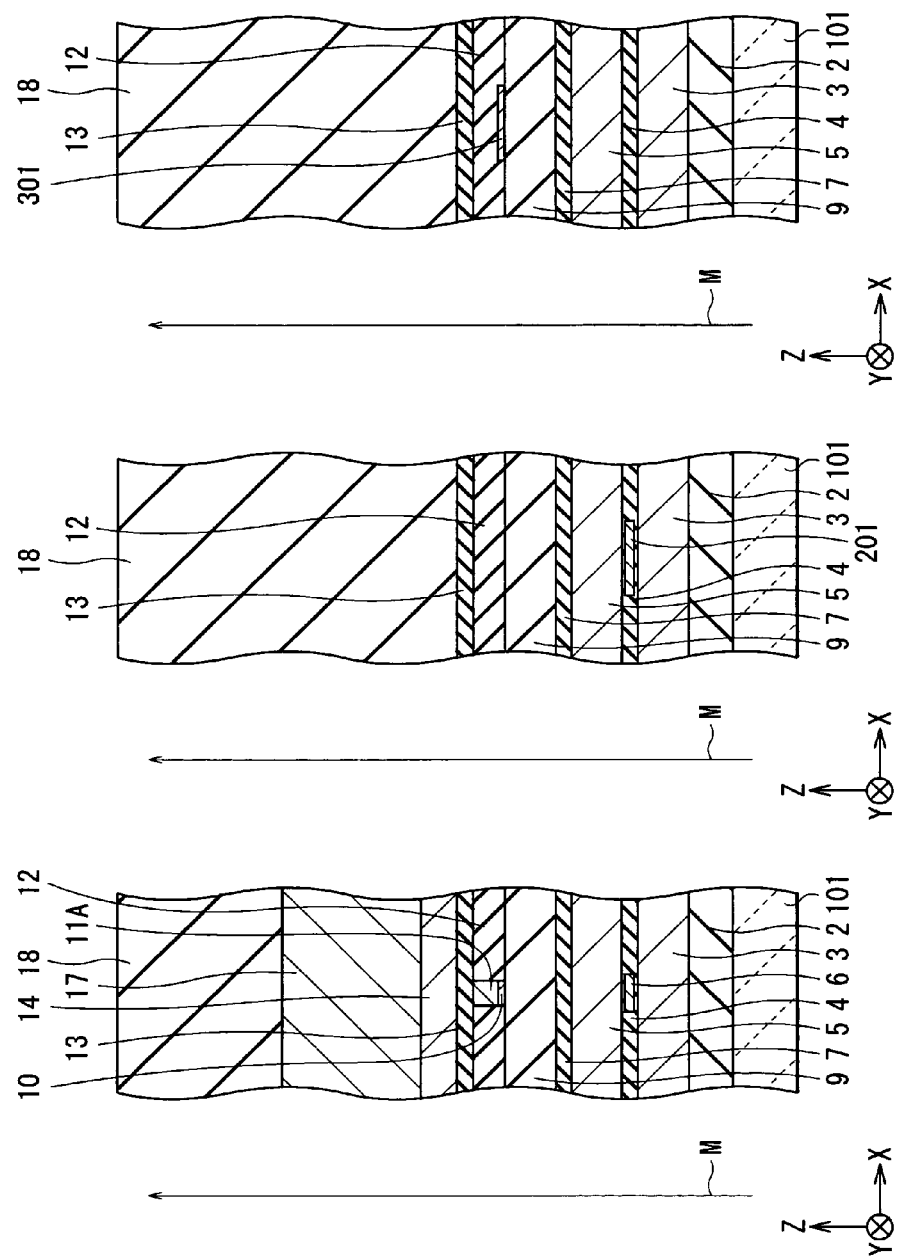
FIGS. 5A to 5C are cross sections showing other sectional configurations (sectional configurations parallel to an XZ plane) of the stacked structure illustrated in FIG. 1.
Figure 6:
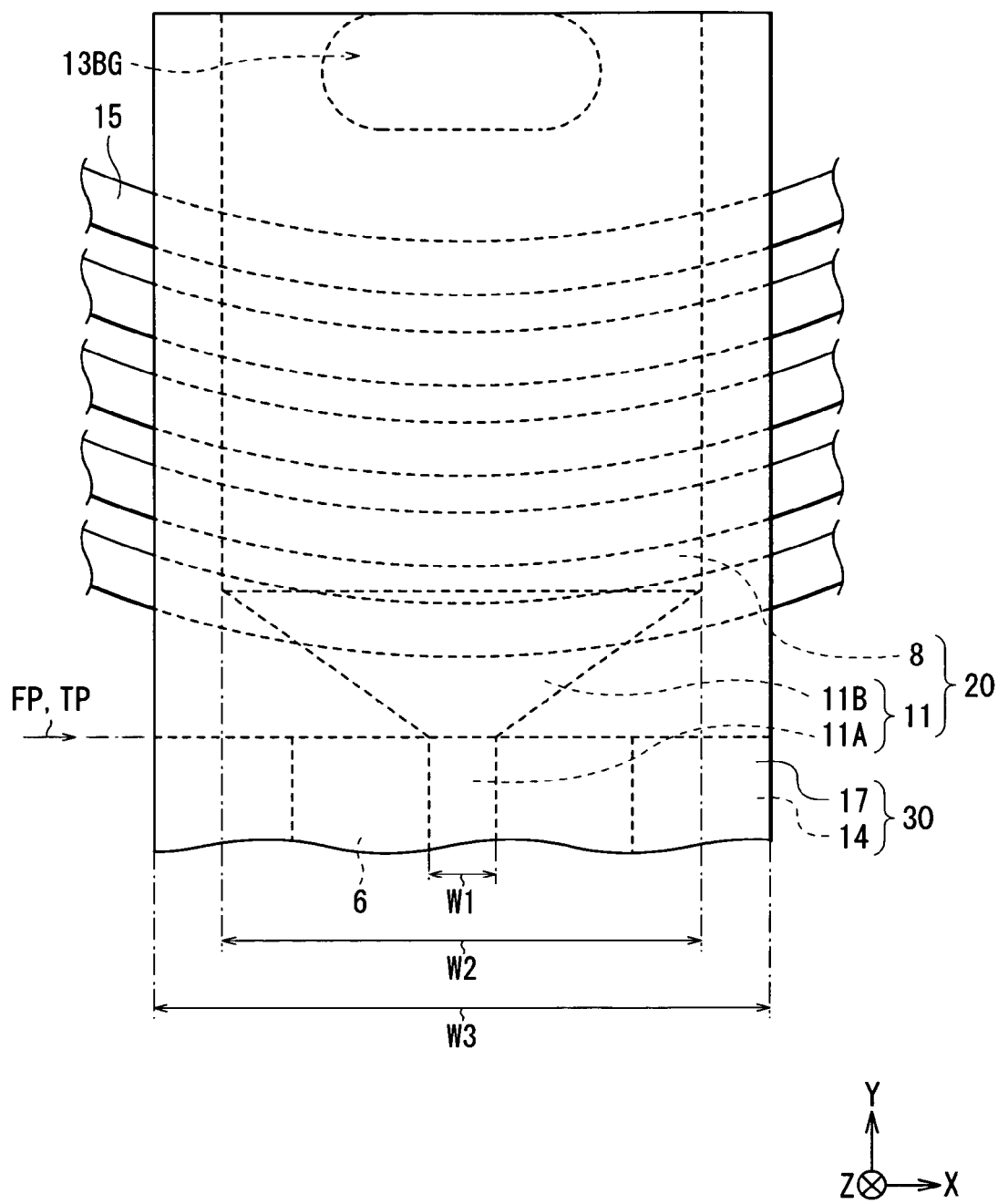
FIG. 6 is a plan view showing a configuration (configuration seen from above in the Z-axis direction) of the stacked structure illustrated in FIG. 1.

With reference to FIGS. 1 to 6, the detailed configuration of the stacked structure 111 in the thin film magnetic head precursor 110 will be described. FIGS. 4 to 6 show the configuration of the stacked structure 111. FIG. 4 is a sectional configuration (sectional configuration along the YZ plane), FIGS. 5A to 5C are another sectional configurations (sectional configurations along the XZ plane), and FIG. 6 is a plan view (configuration seen from above in the Z-axis direction). FIG. 5A is a cross section taken along line VA-VA of FIG. 2, FIG. 5B is a cross section taken along line VB-VB of FIG. 2, and FIG. 5C is a cross section taken along line VC-VC of FIG. 2. The upward-pointing arrows shown in FIG. 4 and FIGS. 5A to 5C indicate the direction (medium travel direction M) of a recording medium (not shown) moving relative to a thin film magnetic head which will be described later.

The stacked structure 111 becomes a thin film magnetic head by being subjected to the polishing process to form an air bearing surface in the thin film magnetic head manufacturing process and, as shown in FIG. 2, is disposed in the region R1 in the device formation surface 101M of the wafer 101. The stacked structure 111 has, for example, as shown in FIGS. 4 and 5A, a stacked structure in which an insulating layer 2 made of a nonmagnetic insulating material such as an aluminum oxide ($Al_2O_3$, hereinbelow, simply called "alumina"), a reproducing head portion 111A for executing a reproducing process by using the MR (Magneto-Resistive) effect, an isolation layer 7 made of a nonmagnetic insulating material such as alumina, a shield-type recording head portion 111B for executing a recording process of the perpendicular recording method, and an overcoat layer 18 made of a nonmagnetic insulating material such as alumina are stacked in this order.

The reproducing head portion 111A has a stacked structure in which, for example, a lower read shield layer 3, a shield gap film 4, and an upper read shield layer 5 are stacked in this order. In the shield gap film 4, an MR device 6 as a reproduction device is buried.

The lower and upper read shield layers 3 and 5 are provided to magnetically isolate the MR device 6 from the periphery and extend rearward from the side which will become the air bearing surface (the left side in FIG. 4 or the lower side of FIG. 6). Each of the lower and upper read shield layers 3 and 5 is made of, for example, a magnetic material such as a nickel iron alloy (NiFe (for example, Ni: 80% by weight and Fe: 20% by weight) which will be simply called "permalloy (trademark)" hereinbelow). Each of the layers has a thickness of about 1.0 µm to 2.0 µm.

The shield gap film 4 is provided to electrically isolate the MR device 6 from the periphery and is made of, for example, a nonmagnetic insulating material such as alumina.

The MR device 6 executes a magnetic process (reproducing process) by using, for example, the GMR (Giant Magneto-Resistive) effect or TMR (Tunneling Magneto-Resistive) effect, and extends rearward from the side which will become the air bearing surface.

The recording head portion 111B has a stacked structure in which, for example, a magnetic pole layer 20 whose periphery is buried by insulating layers 9 and 12, a gap layer 13 in which an opening (back gap 13BG) for magnetic coupling is formed, a thin film coil 15 buried by an insulating layer 16, and a write shield layer 30 are stacked in this order.

The magnetic pole layer 20 is provided to contain a magnetic flux generated by the thin film coil 15 and to emit the magnetic flux toward a recording medium, thereby executing a magnetic process (recording process). The magnetic pole layer 20 extends rearward from the side which will become the air bearing surface, concretely, extends to the back gap 13BG formed in the gap layer 13. The magnetic pole layer 20 has a three-layer structure in which a main magnetic pole layer 11 functioning as a magnetic flux emitting part, an auxiliary magnetic pole layer 8 functioning as a magnetic flux containing part for assuring a magnetic volume (magnetic flux containing amount) of the main magnetic pole layer 11, and a seed layer 10 sandwiched between the main magnetic pole layer 11 and the auxiliary magnetic pole layer 8 are stacked. The insulating layers 9 and 12 are provided to electrically isolate the auxiliary magnetic pole layer 8 and the main magnetic pole layer 11 from the periphery and are made of, for example, a nonmagnetic insulating material such as alumina.

The auxiliary magnetic pole layer 8 extends rearward from a position receded from the main magnetic pole layer 11 on the leading side of the main magnetic pole layer 11, concretely, extends to the back gap 13BG and is coupled to the main magnetic pole layer 11 via the seed layer 10. "Coupling" denotes not simple physical contact but physical contact and a magnetically conductible state. The definition of "coupling" will be similarly applied below. The auxiliary magnetic pole layer 8 is made of, for example, a material similar to that of the main magnetic pole layer 11 and has, as shown in FIG. 6, a rectangular plane shape having a width W2. The "leading side" is, when a traveling state of the recording medium traveling in the medium travel direction M shown in FIGS. 4 and 5 is regarded as a flow, an inflow side (the side opposite to M in the medium travel direction) and is a down side in the thickness direction (Z-axis direction). On the other side, the outflow side (M side in the medium travel direction) is called a "trailing side" and is the upper side in the thickness direction.

The main magnetic pole layer 11 extends rearward from the side which will become the air bearing surface on the trailing side of the auxiliary magnetic pole layer 8, concretely, extends to the back gap 13BG like the auxiliary magnetic pole layer 8 and is made of, for example, a magnetic material such as permalloy or an iron-cobalt-base alloy. Examples of the "iron-cobalt-base alloy" are an iron cobalt alloy (FeCo) and an iron cobalt nickel alloy (FeCoNi). Preferably, the main magnetic pole layer 11 is made of a magnetic material having high saturated magnetic flux density such as the iron-cobalt-base alloy. The main magnetic pole layer 11 has a configuration in which, for example, as shown in FIG. 6, in order from the side which will become the air bearing surface, a front end portion 11A having uniform width W1 specifying the recording track width (for example, W1=about 0.15 µm) and functioning as a track width specifying part which specifies the recording track width, and a rear end portion 11B having width W2 larger than the width W1 of the front end portion 11A (W2>W1) are coupled to each other. For example, the rear end portion 11B has a uniform width (width W2) in the rear portion and is gradually narrowed toward the front end portion 11A in the front portion. The position where the width of the main magnetic pole layer 11 increases from the front end portion 11A (width W1) to the rear end portion 11B (width W2) is a "flare point (FP)" as one of important factors for determining the recording performances of the thin film magnetic head.

The seed layer 10 is used, for example, as an electrode film for making a plating film grown and, more concretely, used for forming the main magnetic pole layer 11 by using a plating process. The seed layer 10 is made of, for example, a magnetic material similar to the material of the main magnetic pole layer 11 or a nonmagnetic material different from the material of the main magnetic pole layer 11 and has a pattern shape corresponding to the planar shape of the main magnetic pole layer 11. Examples of the "nonmagnetic material" are ruthenium (Ru) and titanium (Ti). In FIG. 6, the seed layer 10 is not shown.

The gap layer 13 is to provide a gap (magnetic gap) for magnetically separating the magnetic pole layer 20 and the write shield layer 30 from each other. The gap layer 13 is made of a non-magnetic insulating material such as alumina and has a thickness of about 0.2 µm or less.

The thin film coil 15 generates a magnetic flux for recording and is made of, for example, a high conductive material such as copper (Cu). The thin film coil 15 has, for example, as shown in FIGS. 4 and 6, a winding structure (spiral structure) that is wound around the back gap 13BG as a center. In FIGS. 4 and 6, only part of the plurality of turns of the thin film coil 15 is shown.

The insulating layer 16 covers the thin film coil 15 so as to be electrically isolated from the periphery and is formed on the gap layer 13 so as not to close the back gap 13BG. The insulating layer 16 is made of, for example, a nonmagnetic insulating material such as a photoresist (photosensitive resin), spin on glass (SOG), or the like which displays fluidity when heated, and the portion of the edge of the insulating layer 16 has a rounded and inclined surface. The front end position of the insulating layer 16 is a "throat height zero position TP" as one of important factors determining the recording performance of the thin film magnetic head.

The write shield layer 30 is a magnetic shield layer which receives a spread component of a magnetic flux emitted from the magnetic pole layer 20 and prevents spread of the magnetic flux. The write shield layer 30 has not only the function of preventing spread of the magnetic flux but also the function of, when a magnetic flux is emitted from the magnetic pole layer 20 toward a recording medium, collecting the magnetic flux returned from the recording medium (used for a recording process) and re-supplying the magnetic flux to the magnetic pole layer 20, that is, circulating the magnetic flux between the thin film magnetic head and the recording medium. The write shield layer 30 extends rearward from the side which will become the air bearing surface on the trailing side of the magnetic pole layer 20, thereby being isolated from the magnetic pole layer 20 by the gap layer 13 in the front part and being coupled to the magnetic pole layer 20 via the back gap 13BG on the rear part.

Specifically, the write shield layer 30 has, for example, a configuration in which a TH specifying layer 14 extending rearward from the side which will become the air bearing surface, while being adjacent to the gap layer 13, concretely, to a position between the position in which the air bearing surface is to be provided and the back gap 13BG and a yoke layer 17 extending rearward from the side which will become the air bearing surface on the trailing side of the TH specifying layer 14, concretely, to the back gap 13BG are coupled. In short, the write shield layer 30 has a two-layer structure in which the yoke layer 17 is stacked on the TH specifying layer 14.

The TH specifying layer 14 functions as a main magnetic flux receiving port. The TH specifying layer 14 is made of a magnetic material such as permalloy, iron nickel alloy (FeNi), or iron-cobalt-base alloy and has a rectangular planar shape having a width W3 larger than the width W2 of the main magnetic pole layer 11 (W3>W2) as shown in FIG. 6. To the TH specifying layer 14, the insulating layer 16 in which the thin film coil 15 is buried is adjacent. That is, the TH specifying layer 14 plays the role of specifying the forefront end position of the insulating layer 16 (throat height zero position TP).

The yoke layer 17 functions as a path of the magnetic flux received from the TH specifying layer 14. The yoke layer 17 extends, for example, from the side which will become the air bearing surface to the back gap 13BG so that it extends partially on the TH specifying layer 14 in the front part and is coupled to the magnetic pole layer 20 via the back gap 13BG. In particular, for example, as shown in FIG. 6, the yoke layer 17 is made of a magnetic material similar to that of the TH specifying layer 14 and has a rectangular planar shape having a width W3 as shown in FIG. 6.

In each of the regions R2A and R2B in the device formation surface 101M of the wafer 101 shown in FIG. 2, a stacked structure similar to the stacked structure 111 provided in the region R1 is provided as shown in FIGS. 5B and 5C.

Concretely, in the region R2A, as shown in FIG. 5B, a stacked structure similar to the stacked structure 111 is provided except that the resistance film 201 is included in place of the MR device 6, and the magnetic pole layer 20, thin film coil 15, and write shield layer 30 are not included. Specifically, the resistance film 201 in the RLG sensor 200 for the reproducing head portion provided in the region R2A is disposed in the same level as that of the MR device 6 of the reproducing head portion 111A provided in the region R1. The resistance film 201 is formed in parallel with the MR device 6 in the process of forming the thin film magnetic head precursor 110 on the device formation surface 101M of the wafer 101. The M sensor 400 provided in the region R2A is formed in parallel so as to have dimensions similar to those of the MR device 6 to grasp electric resistance of the MR device 6.

On the other hand, in the region R2B, as shown in FIG. 5C, a stacked structure similar to the stacked structure 111 is provided except that the resistance film 301 is included in place of the magnetic pole layer 20, and the MR device 6, thin film coil 15, and write shield layer 30 are not included. Specifically, the resistance film 301 in the RLG sensor 300 for the recording head portion provided in the region R2B is disposed in the same level as that of the magnetic pole layer 20 of the recording head portion 111B provided in the region R1. The resistance film 301 is formed in parallel with the magnetic pole layer 20 in the process of forming the thin film magnetic head precursor 110 in the device formation surface 101M of the wafer 101. FIG. 5C shows the case where, for example, the resistance film 301 is disposed at the same level as that of the seed layer 10 of the magnetic pole layer 20, that is, the resistance film 301 is formed in parallel with the seed layer 10.

Figure 20:
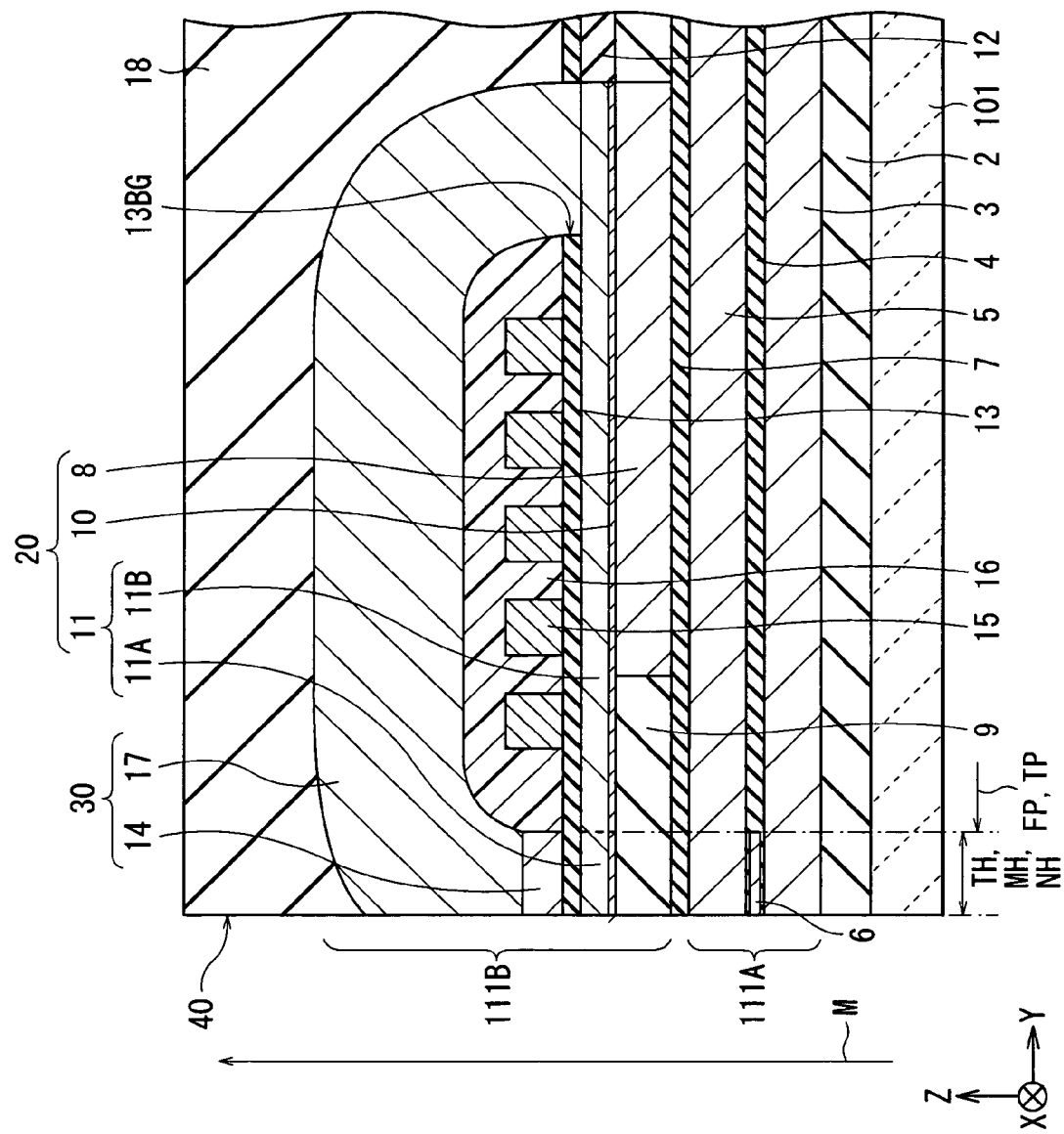
FIG. 20 is a cross section showing a sectional configuration (configuration parallel to a YZ plane) of a thin film magnetic head manufactured by using the thin film magnetic head manufacturing method of the invention.

Referring now to FIGS. 4 to 6, the functions of the RLG sensor 200 for the reproducing head portion and the RLG sensor 300 for the recording head portion shown in FIG. 2 will be described more concretely as follows. The resistance film 201 of the RLG sensor 200 for the reproducing head portion is used to grasp the polishing amount of the reproducing head portion 111A so that the dimension of the MR device 6 in the extending direction of the MR device 6 becomes a predetermined dimension in the thin film magnetic head manufacturing process. The "dimension of the MR device 6" is the height from the front edge (the edge exposed in the air bearing surface) to the rear edge (the edge on the side far from the air bearing surface) of the MR device 6, which is an MR height as an important factor contributing to reproduction performances of the thin film magnetic head. The resistance film 301 of the RLG sensor 300 for the recording head portion is used to grasp the polishing amount of the recording head portion 111B so that the dimension of the front end portion 11A in the extending direction of the magnetic pole layer 20 becomes a predetermined dimension in the thin film magnetic head manufacturing process. The "dimension of the front end portion 11A" is the height from the front edge (the edge exposed in the air bearing surface) of the front end portion 11A to the rear edge (the edge on the side far from the air bearing surface, that is, the position where the front end portion 11A and the rear end portion 11B are coupled), which is a neck height as an important factor contributing to recording performances of the thin film magnetic head. A proper offset may be provided between the height of the resistance film 301 and the neck height (the height of the front end portion 11A). In FIGS. 20 and 21 which will be described later, the MR height and the neck height will be concretely shown as "MR height MH" and "neck height NH".

A method of manufacturing the thin film magnetic head structure 100 shown in FIGS. 1 to 6 will now be described with reference to FIG. 1 to FIGS. 12A and 12B. FIGS. 7A and 7B to FIGS. 12A and 12B are diagrams for explaining processes of manufacturing the main part (the magnetic pole layer 20 and the resistance film 301) of the thin film magnetic head structure 100. FIGS. 7A, 8A, 9A, 10A, 11A, and 12A enlargedly show part of the region R1 shown in FIG. 2, and FIGS. 7B, 8B, 9B, 10B, 11B, and 12B enlargedly show part of the region R2B shown in FIG. 2. In the following, first, an outline of processes of manufacturing the thin film magnetic head structure 100 (the thin film magnetic head precursor 110, the RLG sensor 200 for the reproducing head portion, and the RLG sensor 300 for the recording head portion) will be described with reference to FIGS. 1 to 6. After that, processes of forming the stacked structure 111 and the resistance films 201 and 301 will be described in detail with reference to FIG. 1 to FIGS. 12A and 12B. Since the materials, dimensions, and structural features of the series of the components of the thin film magnetic head structure 100 have been already described in detail, the description will not be repeated.

The thin film magnetic head structure 100 is manufactured by sequentially forming and stacking the components by mainly using an existing thin film process including a film forming technique such as plating and sputtering, a patterning technique such as photolithography technique, and an etching technique such as dry etching and wet etching.

At the time of manufacturing the thin film magnetic head structure 100, as shown in FIGS. 1 to 6, the wafer 101 is prepared, the stacked structures 111 are formed in a plurality of rows in the regions R1 in the device formation surface 101M of the wafer 101 and, similarly, the resistance films 201 and 301 and the M sensors 400 are formed in a plurality of rows in the regions R2 in correspondence with the arrangement direction of the stacked structures 111. At the time of forming the resistance films 201 and 301, for example, the resistance films 201 are disposed in the regions R2A in the regions R2 and the resistance films 301 are disposed in the remaining regions R2B, thereby alternately disposing the resistance films 201 and 301 in the region R2 (R2A and R2B). In particular, part of the resistance films 201 is replaced with the M sensors 400. At the time of forming the stacked structures 111 and the resistance films 201 and 301 in the device formation surface 101M of the wafer 101, for example, the regions R3 are assured as the redundant part in addition to the regions R1 and R2 (R2A and R2B).

Subsequently, the wiring patterns 112 are formed so as to be led from the stacked structures 111 in the regions R1 and, similarly, the wiring patterns 202 and 302 are formed in the regions R2. At the time of forming the wiring patterns 202 and 302, the wiring patterns 203 are formed so as to be led from the resistance films 202 in the regions R2A, and the wiring patterns 303 are formed so as to be led from the resistance films 302 in the regions R2B.

Finally, the electrode pads 113 are formed so as to be electrically connected to the stacked structures 111 via the wiring patterns 112 in the regions R1, and the electrode pads 203 and 303 are formed in the regions R2. At the time of forming the electrode pads 203 and 303, the electrode pads 203 are formed so as to be electrically connected to the resistance films 201 via the wiring patterns 202 in the regions R2A, and the electrode pads 303 are formed so as to be electrically connected to the resistance films 301 via the wiring patterns 302 in the regions R2B. As a result, the thin film magnetic head precursor 110 is formed so as to have a structure in which the electrode pads 113 are electrically connected to the stacked structures 111 via the wiring patterns 112 in the regions R1, and the RLG sensors 200 for the reproducing head portions are formed so as to have a structure in which the electrode pads 203 are electrically connected to the resistance films 201 via the wiring patterns 202 in the regions R2A. Similarly, the RLG sensors 300 for the recording heads are formed so as to have a structure in which the electrode pads 303 are electrically connected to the resistance films 301 via the wiring patterns 302 in the regions R2B. In such a manner, the thin film magnetic head structure 100 shown in FIGS. 1 to 6 is completed.

In the process of manufacturing the thin film magnetic head structure 100, at the time of forming the thin film magnetic head precursor 110, the wiring patterns 112 are formed separately from the stacked structures 111. However, the invention is not limited to the method. For example, the wiring patterns 112 may be formed in parallel with the stacked structures 111. Obviously, the wiring patterns 202 and 302 may be also formed, for example, in parallel with the resistance films 201 and 301.

At the time of forming the stacked structures 111 and the resistance films 201 and 301, as shown in FIGS. 2, 4, and 5A, the insulating layer 2 is formed in the regions R1 in the device formation surface 101M of the wafer 101. After that, on the insulating layer 2, the lower read shield layer 3, the shield gap film 4 in which the MR device 6 is buried, and the upper read shield layer 5 are stacked in accordance with this order, thereby forming the reproducing head portion 111A having the stacked structure of the lower read shield layer 3, the shield gap layer 4, and the upper read shield layer 5. In this case, as shown in FIGS. 5B and 5C, the insulating layer 2, lower read shield layer 3, shield gap film 4, and upper read shield layer 5 are formed in parallel in the regions R1 and also the regions R2A and R2B so as to be stacked.

In particular, at the time of forming the MR device 6 in the regions R1, as shown in FIGS. 2, 3, and 5B, the MR device 6 is pattern-formed in the regions R1 and, simultaneously, structures similar to the MR device 6 are pattern-formed in the regions R2A by using the process of forming the MR device 6, thereby forming the resistance films 201 and the M sensors 400 in parallel with the MR device 6 in the regions R2A. At the time of forming the resistance films 201 and the M sensors 400, for example, as shown in FIG. 3, the three kinds of resistance films 201A to 201C having pattern dimensions different from each other are included and the M sensors 400 have the pattern dimensions similar to those of the MR devices 6. The resistance films 201 (201A to 201C) and the M sensors 400 formed in parallel with the MR devices 6 are naturally made of the same material as that of the MR devices 6. To pattern-form the resistance films 201 and the M sensors 400, a pattern forming technique using the photolithography process is employed. The details of the pattern forming technique will be described later.

Subsequently, as shown in FIGS. 2, 4, and 5A, the isolation layer 7 is formed on the reproducing head portion 111A in the region R1 and, after that, the magnetic pole layer 20 whose periphery is buried by the insulating layers 9 and 12 is formed on the isolation layer 7. At the time of forming the magnetic pole layer 20, the auxiliary magnetic pole layer 8 is formed so that its periphery is buried by the insulating layer 9 and, after that, the seed layer 10 and the main magnetic pole layer 11 are formed so that the periphery is buried by the insulating layer 12 on the insulating layer 9 and the auxiliary magnetic pole layer 8, thereby obtaining the three-layer structure in which the auxiliary magnetic pole layer 8, seed layer 10, and main magnetic pole layer 11 are stacked in this order. In this case, as shown in FIGS. 5B and 5C, the insulating layers 9 and 12 are formed in parallel so as to be stacked in the regions R2A and R2B in addition to the regions R1.

In particular, at the time of forming the magnetic pole layer 20 in the region R1, as shown in FIGS. 2 and 5C, for example, by the following procedure, simultaneously with formation of the magnetic pole layer 20 in the region R1, structures similar to the magnetic pole layers 20 are formed in the regions R2B by using the process of forming the magnetic pole layers 20, thereby forming the resistance film 301 in parallel with the magnetic pole layer 20 in the region R2B.

Figure 7A:
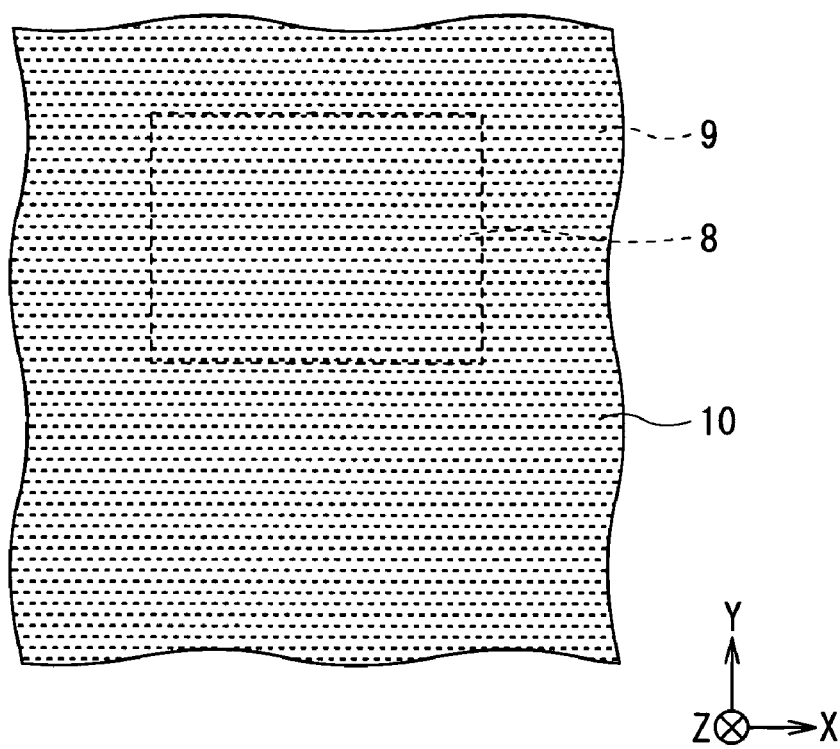
FIGS. 7A and 7B are plan views showing a process of forming a main part of a thin film magnetic head structure as a method of manufacturing a thin film magnetic head structure according to an embodiment of the invention.
Figure 7B:
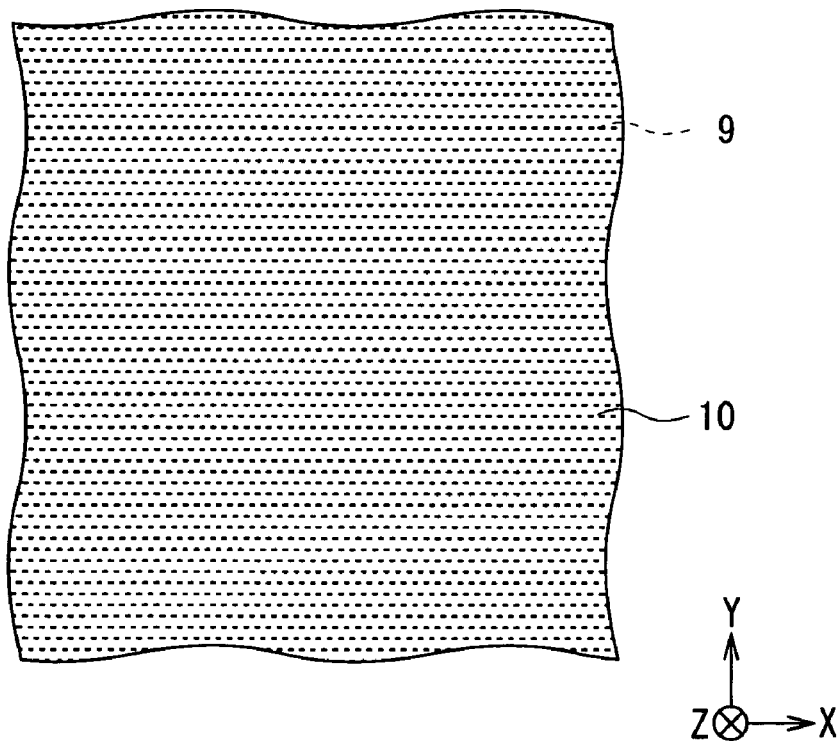

Specifically, at the time of forming the resistance film 301 in parallel with the magnetic pole layer 20, first, as shown in FIGS. 7A and 7B, the seed layer 10 is formed so as to cover both of the regions R1 and R2B in the device formation surface 101M of the wafer 101 by using, for example, sputtering. As the material of forming the seed layer 10, for example, a material similar to that of the main magnetic pole layer 11 formed in a post process, concretely, a conductive magnetic material such as permalloy (NiFe) or an iron cobalt nickel alloy (FeCoNi) may be used or a material different from the material of the main magnetic pole layer 11, concretely, a conductive nonmagnetic material such as ruthenium (Ru) or titanium (Ti) may be used.

Subsequently, a photoresist is applied on the surface of the seed layer 10 to form a photoresist film, and the photoresist film is patterned (developed and exposed) by using the photolithography process, thereby forming a photoresist pattern 501 as shown in FIGS. 8A and 8B. At the time of forming the photoresist pattern 501, by making the patterning shape vary between the regions R1 and R2B, an opening 501K1 is formed so as to have an opening pattern corresponding to the planar shape of the main magnetic pole layer 11 to be formed in a post process in the region R1 as shown in FIG. 8A, and an opening 501K2 is formed so as to have an opening pattern corresponding to the planar shape (for example, rectangular shape) of the resistance film 301 to be formed in a post process in the region R2B as shown in FIG. 8B. In particular, at the time of forming the openings 501K1 and 501K2 in the photoresist pattern 501, considering that the flare point FP is substantially determined on the basis of the opening pattern of the opening 501K1, the opening 501K1 is positioned so that the flare point FP is in a desired position and the opening 501K2 is positioned so that the position of the rear end (the edge of the side opposite to the side which will become the air bearing surface) of the resistance film 301 to be formed in a post process coincides with the flare point FP. It is not always necessary to position the opening 501K2 so that the position of the rear end of the resistance film 301 matches the flare point FP. For example, the opening 501K2 may be positioned so as to provide a proper offset S (for example, $0\ \mu m < S \leq 1.0\ \mu m$) between the position of the rear end of the resistance film 301 and the flare point FP.

Figure 9A:
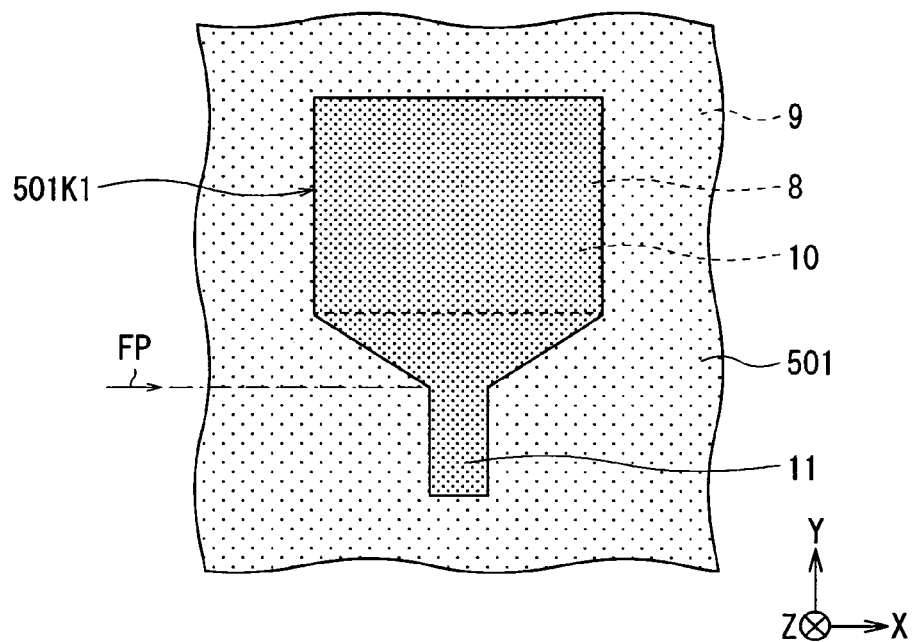
FIGS. 9A and 9B are plan views illustrating a process subsequent to the process shown in FIGS. 8A and 8B.
Figure 9B:
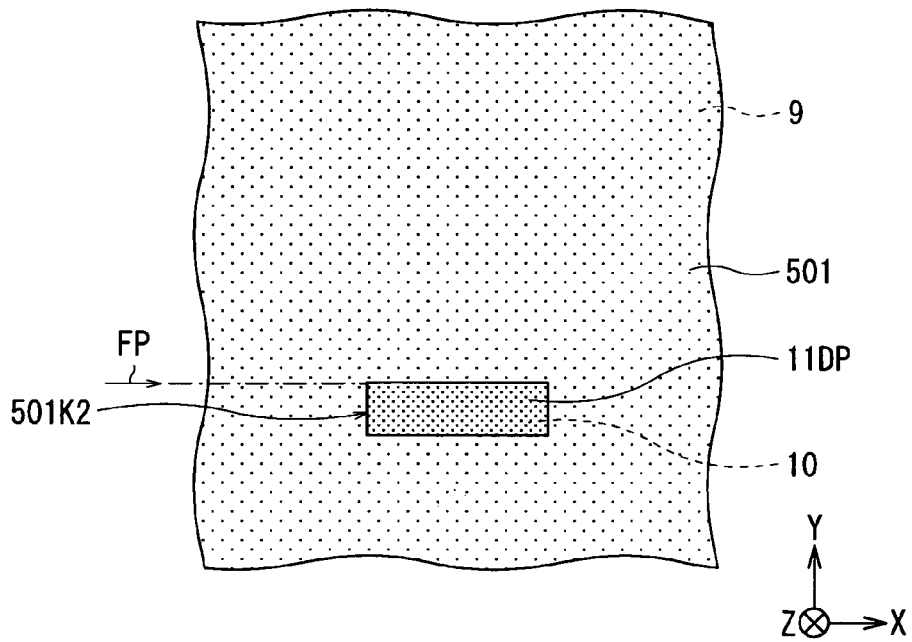

Subsequently, the seed layer 10 is used as an electrode film and a plating film is made selectively grow in the openings 501K1 and 501K2 by using the photoresist pattern 501, thereby pattern-forming the main magnetic pole layer 11 in the opening 501K1 in the photoresist pattern 501 in the region R1 as shown in FIG. 9A and forming a dummy pattern 11DP in the opening 501K2 in the photoresist pattern 501 in the region R2B as shown in FIG. 9B. The dummy pattern 11DP will be used as a mask for etching the seed layer 10 in a post process.

Figure 10A:
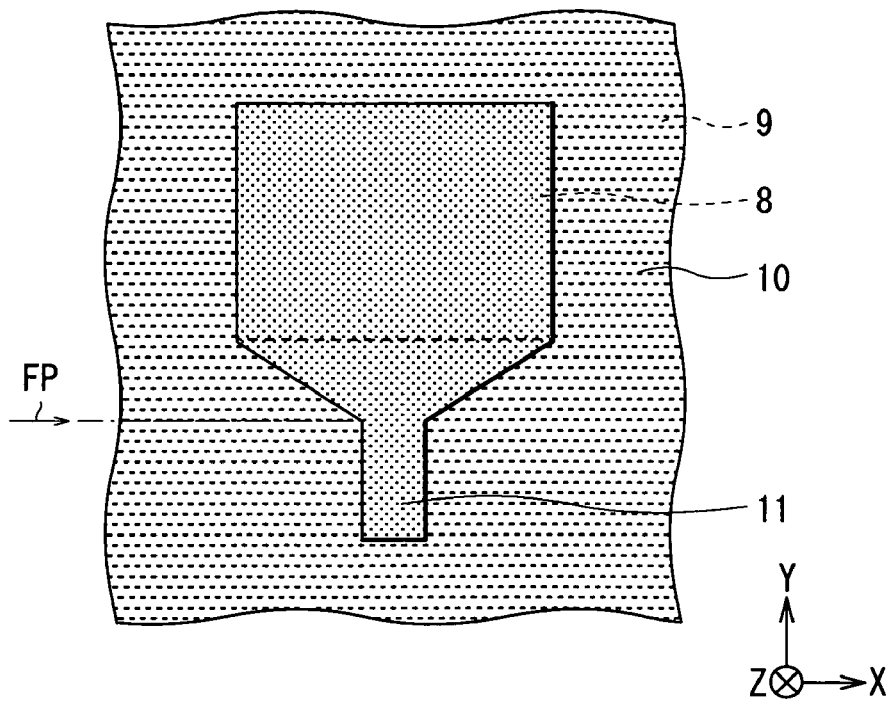
FIGS. 10A and 10B are plan views illustrating a process subsequent to the process shown in FIGS. 9A and 9B.
Figure 10B:
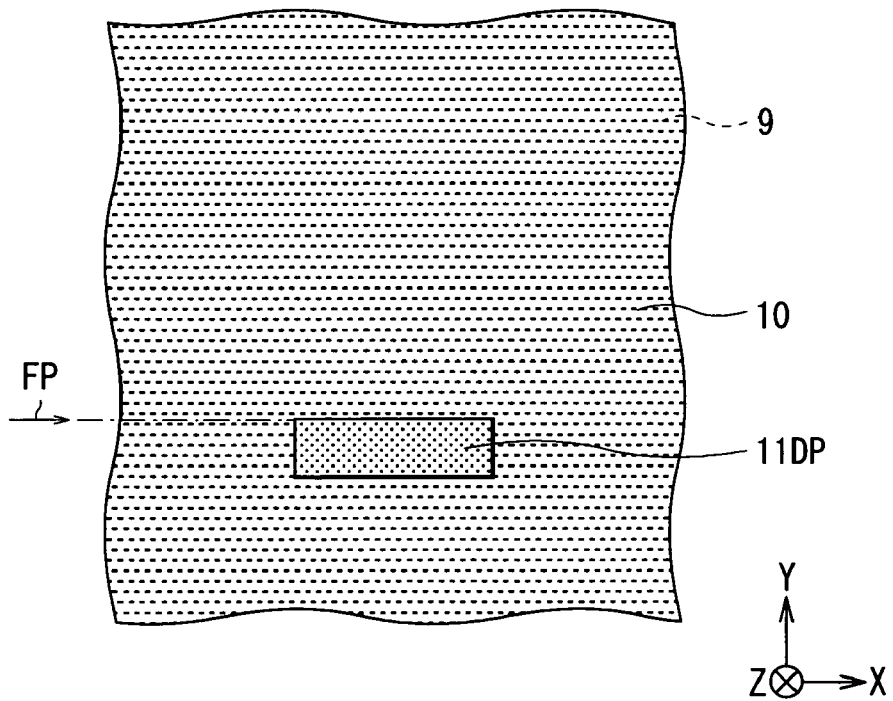

After that, by removing the photoresist pattern 501, as shown in FIGS. 10A and 10B, the seed layer 10 is exposed in the periphery of the main magnetic pole layer 11 and the dummy pattern 11DP in the regions R1 and R2B.

Figure 11A:
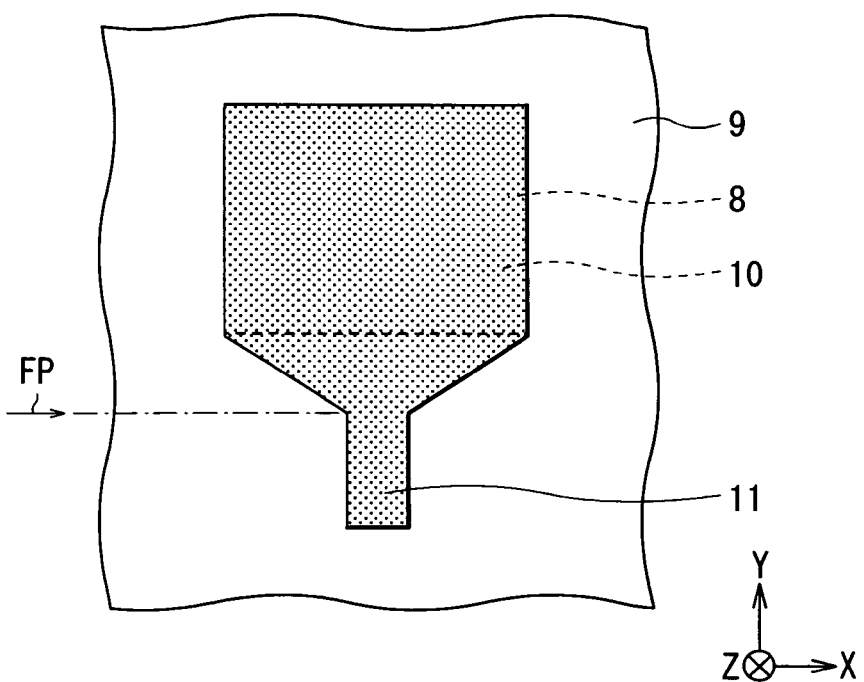
FIGS. 11A and 11B are plan views illustrating a process subsequent to the process shown in FIGS. 10A and 10B.
Figure 11B:
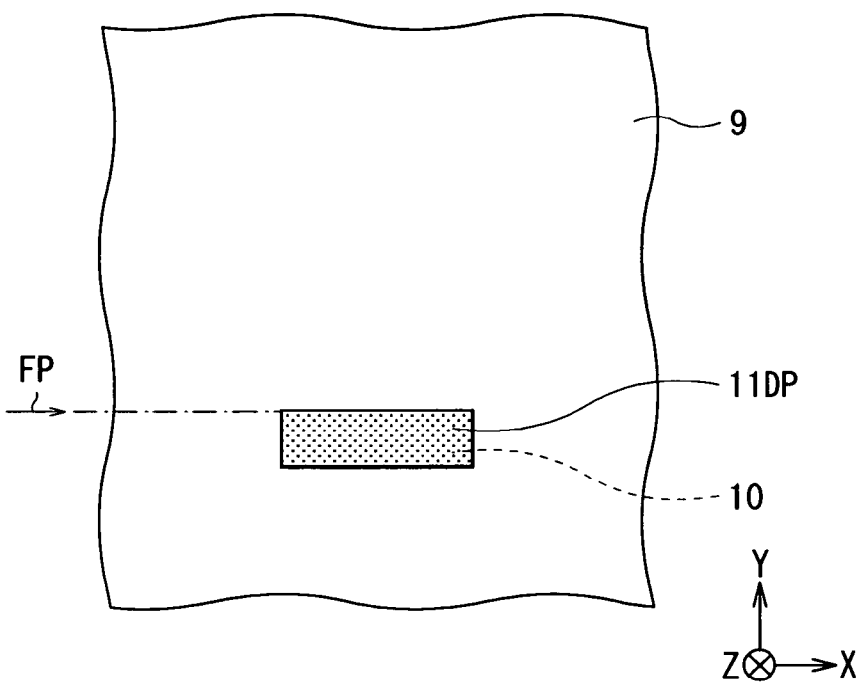

Both of the main magnetic pole layer 11 and the dummy pattern 11DP are used as a mask and the seed layer 10 is selectively etched by using, for example, ion milling, thereby selectively removing the periphery portion of the main magnetic pole layer 11 and the periphery portion of the dummy pattern 11DP in the seed layer 10 as shown in FIGS. 11A and 11B. After the etching process, as shown in FIG. 11A, the seed layer 10 remains so as to have the pattern shape corresponding to the planar shape of the main magnetic layer 11 below the main magnetic pole layer 11, that is, only in the region corresponding to the pattern shape of the main magnetic pole layer 11 in the region R1. As shown in FIG. 11B, the seed layer 10 remains so as to have the pattern shape corresponding to the planar shape of the dummy pattern 11DP under the dummy pattern 11DP, that is, only in the region corresponding to the pattern shape of the dummy pattern 11DP in the region R2B.

Figure 12A:
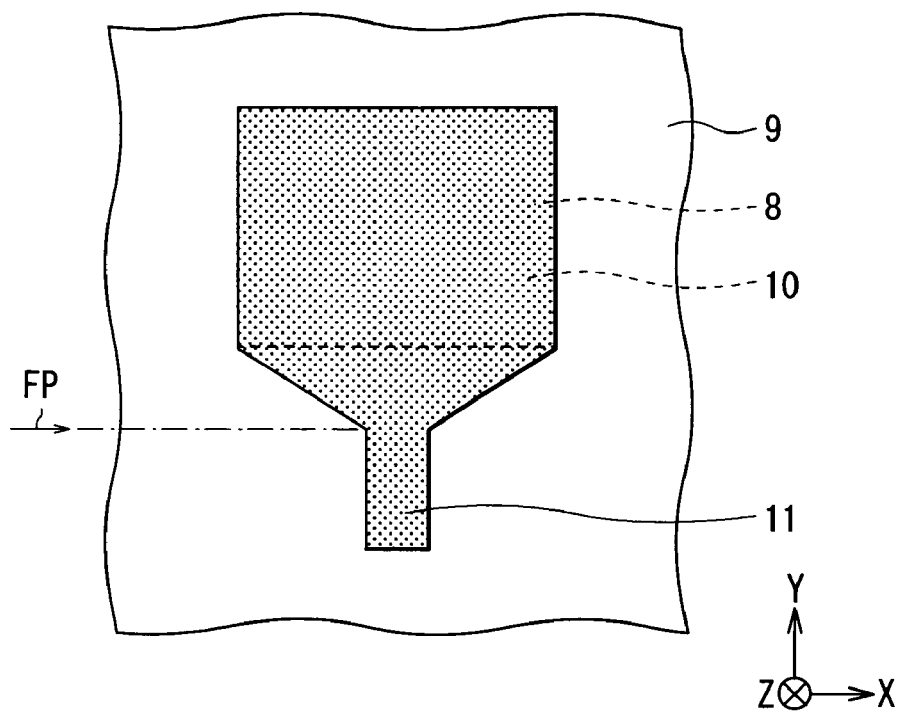
FIGS. 12A and 12B are plan views illustrating a process subsequent to the process shown in FIGS. 11A and 11B.
Figure 12B:
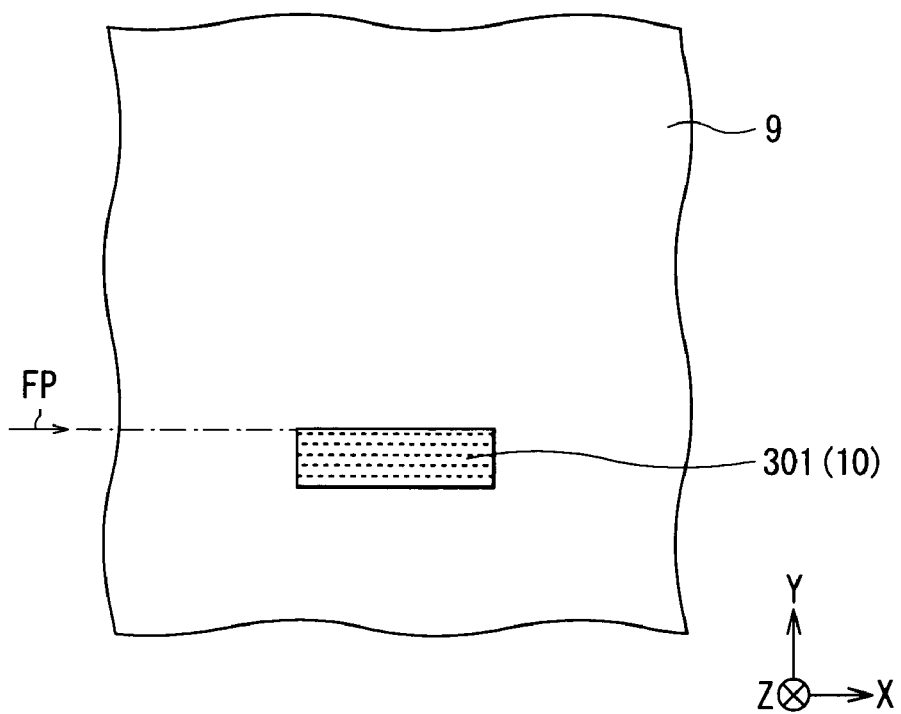

Finally, as shown in FIGS. 12A and 12B, while maintaining the main magnetic pole layer 11 in the region R1, the dummy pattern 11DP is selectively removed in the region R2B. Consequently, the seed layer 10 and the main magnetic pole layer 11 are formed in the region R1 as shown in FIG. 12A, so that the magnetic pole layer 20 is formed so as to have a three-layer structure in which the auxiliary magnetic pole layer 8, seed layer 10, and main magnetic pole layer 11 are stacked in this order as shown in FIG. 4 and the resistance film 301 is formed as a remainder of the seed layer 10 in the region R2B.

The process of forming the stacked structure 111 and the resistance films 201 and 301 will now be described. After formation of the magnetic pole layer 20 and the resistance film 301, as shown in FIGS. 2, 4, and 5A, the gap layer 13 in which the back gap 13BG is formed, the insulating layer 16 in which the thin film coil 15 is buried, and the write shield layer 30 (the TH specifying layer 13 and the yoke layer 16) are stacked in this order on the main magnetic pole layer 11 and the insulating layer 12 in the region R1, thereby forming the recording head portion 111B so as to have the stacked structure of the insulating layers 9, 12, the magnetic pole layer 20, and the write shield layer 30. In this case, as shown in FIGS. 5B and 5C, the gap layer 13 and the insulating layer 16 are formed in parallel in the region R1 and also the regions R2A and R2B so as to be stacked.

Finally, as shown in FIGS. 2, 4, and 5A, the overcoat layer 18 is formed so as to cover the recording head portion 111B by using, for example, sputtering in the region R1. In this case, as shown in FIGS. 5B and 5C, the overcoat layer 18 is formed so as to be stacked in the regions R1, R2A and R2B. Since the stacked structure 111 is formed so as to include the recording head portion 111A and the reproducing head portion 111B, the stacked structure 111 and the resistance films 201 and 301 are completed.

The thin film magnetic head structure according to the embodiment has, on the device formation surface 101M of the wafer 101, the plurality of thin film magnetic head precursors 110 as preparatory members for forming the thin film magnetic heads, the plurality of RLG sensors 200 for the reproducing head portions used to control progress of a polishing process on the reproducing head portion 111A at the time of forming thin film magnetic heads by forming the air bearing surfaces by polishing the thin film magnetic head precursors 110 together with the wafer 101, and the plurality of RLG sensors 300 for the recording head portions used to control progress of a polishing process on the recording head portion 111B at the time of forming thin film magnetic heads by forming the air bearing surfaces by polishing the thin film magnetic head precursors 110 together with the wafer 101. Consequently, the manufacture of the thin film magnetic heads by using the thin film magnetic head manufacturing method to be described later using the thin film magnetic head structure 100 can contribute to high-precision decision of both of the MR height and the neck height.

Specifically, in the embodiment, the resistance film 201 in the RLG sensor 200 for the reproducing head portion and the resistance film 301 in the RLG sensor 300 for the recording head portion are provided at levels different from each other. Concretely, the resistance film 201 is disposed at the same level as that of the MR device 6 in the reproducing head portion 111A, and the resistance film 301 is disposed at the same level as that of the magnetic pole layer 20 in the recording head portion 111B. Based on the fact that the two resistance films 201 and 301 are disposed at the different levels, both of the progress of the polishing process on the reproducing head portion 111A and the progress of the polishing process on the recording head portion 111B can be grasped by using the RLG sensor 200 for the reproducing head portion and the RLG sensor 300 for the recording head portion at the time of performing the polishing process for forming the air bearing surface in the thin film magnetic head structure 100. Therefore, the polishing process can be performed so that both of the MR height and the neck height can finally have target dimensions while grasping both of the progress of the polishing process on the reproducing head portion 111A and the progress of the polishing process on the recording head portion 111B, so that the invention can contribute to high-precision determination of the MR height and the neck height.

In addition, in the method of manufacturing a thin film magnetic head structure of the embodiment, to manufacture the thin film magnetic head structure 100 having the plurality of thin film magnetic head precursors 110, the plurality of RLG sensors 200 for the reproducing head portions, and the plurality of RLG sensors 300 for the recording head portions on the device formation surface 101M of the wafer 101, only existing thin film processes typified by the film forming technique, patterning technique, and etching technique are used and novel and complicated manufacturing processes are not used. Therefore, the thin film magnetic head structure 100 can be easily manufactured by using only the existing thin film processes.

In particular, in the embodiment, at the time of forming the MR device 6 in the region R1 in the device formation surface 101M in the wafer 101, by using the process of forming the MR device 6, the resistance film 201 is formed in parallel with the MR device 6 in the region R2A, so that both of the MR device 6 and the resistance film 201 are formed by the single process. In this case, different from the case of, not using the process of forming the MR device 6, requiring a second process for forming both of the MR device 6 and the resistance film 201 by forming the resistance film 201 in a forming process different form the process of forming the MR device 6, only a first process is required to form both of the MR device 6 and the resistance film 201, so that the number of manufacturing steps required to manufacture the thin film magnetic head structure 100 decreases. Therefore, from this viewpoint as well, the thin film magnetic head structure 100 can be easily manufactured.

In the embodiment, at the time of forming the magnetic pole layer 20 in the region R1 in the device formation surface 101M in the wafer 101, by using the process of forming the magnetic pole layer 20, the resistance film 301 is formed in parallel with the magnetic pole layer 20 in the region R2B. More concretely, the resistance film 301 is formed in parallel with the seed layer 10 in the magnetic pole layer 20. Consequently, both of the magnetic pole layer 20 and the resistance film 301 are formed in the process of forming the magnetic pole layer 20. Therefore, to form the resistance film 301, different from the case where a new process other than the process of forming the magnetic pole layer 20 is required, a new process for forming the resistance film 301 is not required. Thus, the number of manufacturing steps required for manufacturing the thin film magnetic head structure 100 decreases like in the case of forming the resistance film 201 by using the process of forming the MR device 6. Therefore, from this viewpoint as well, the thin film magnetic head structure 100 can be easily manufactured.

In the embodiment, as shown in FIGS. 2 and 3, the RLG sensors 200 for the reproducing head portions and the RLG sensors 300 for the recording head portions are provided alternately in the regions R2 in the device formation surface 101M of the wafer 101. Concretely, the RLG sensor 200 for the reproducing head portion is disposed in the region R2A, and the RLG sensor 300 for the recording head portion is disposed in the region R2B. However, the invention is not limited to the configuration. The mode of disposing the RLG sensor 200 for the reproducing head portion and the RLG sensor 300 for the recording head portion, specifically, the layout, the number of pieces, and the like of the RLG sensor 200 for the reproducing head portion and the RLG sensor 300 for the recording head portion can be freely changed. For example, in place of alternately providing the RLG sensors 200 for the reproducing head portions and the RLG sensors 300 for the recording head portions in the regions R2, both of the RLG sensor 200 for the reproducing head portion and the RLG sensor 300 for the recording head portion may be provided in each of the regions R2. Also in the cases of changing the disposing modes of the RLG sensor 200 for the reproducing head portion and the RLG sensor 300 for the recording head portion, effects similar to those of the foregoing embodiment can be obtained.

The thin film magnetic head structure and the method of manufacturing the same according to the embodiment of the invention have been described above.

Figure 13:
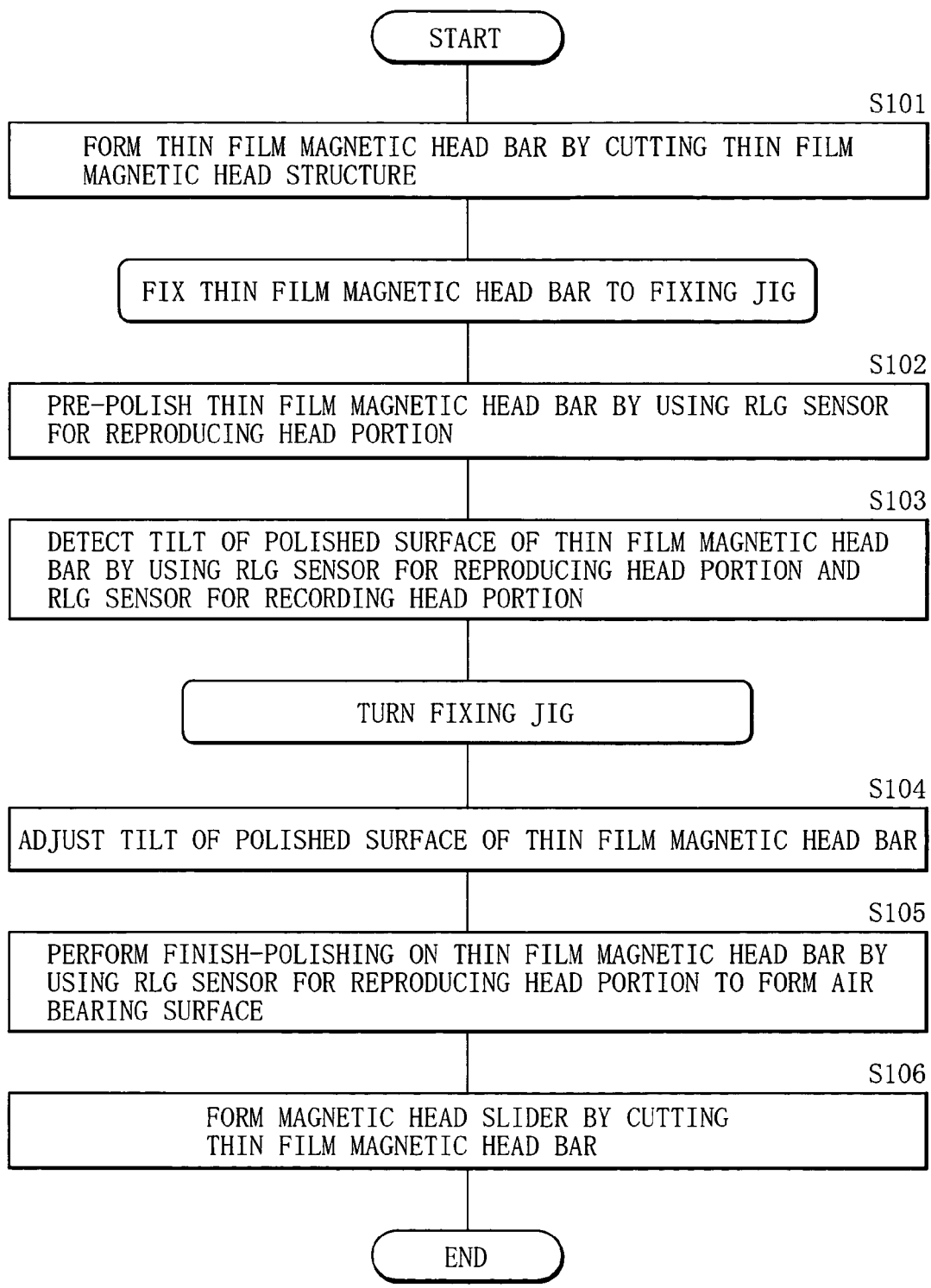
FIG. 13 is a flowchart for illustrating the flow of the method of manufacturing the thin film magnetic head of the invention.
Figure 14:
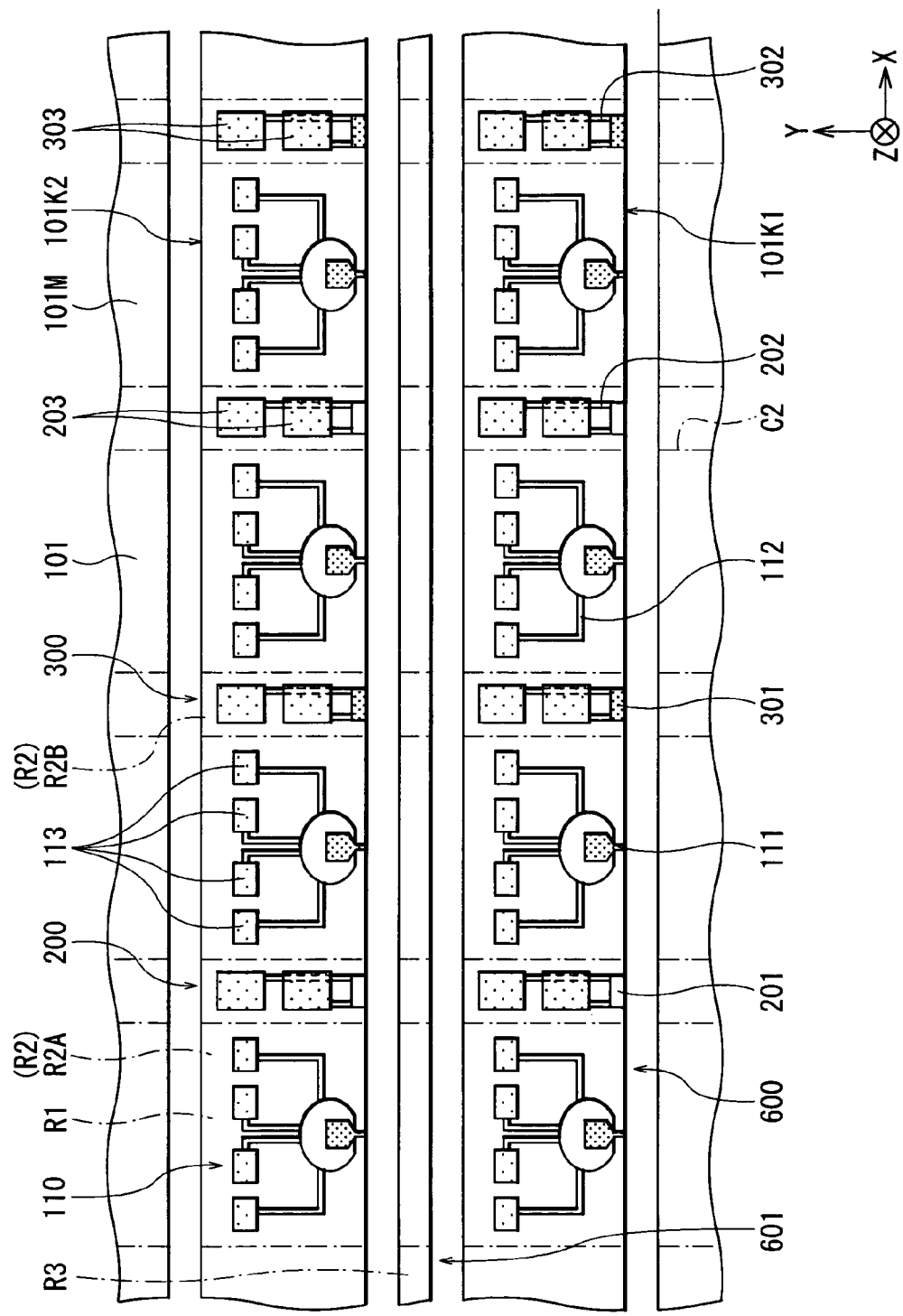
FIG. 14 is a plan view illustrating a concrete procedure of manufacturing a thin film magnetic head.
Figure 22:
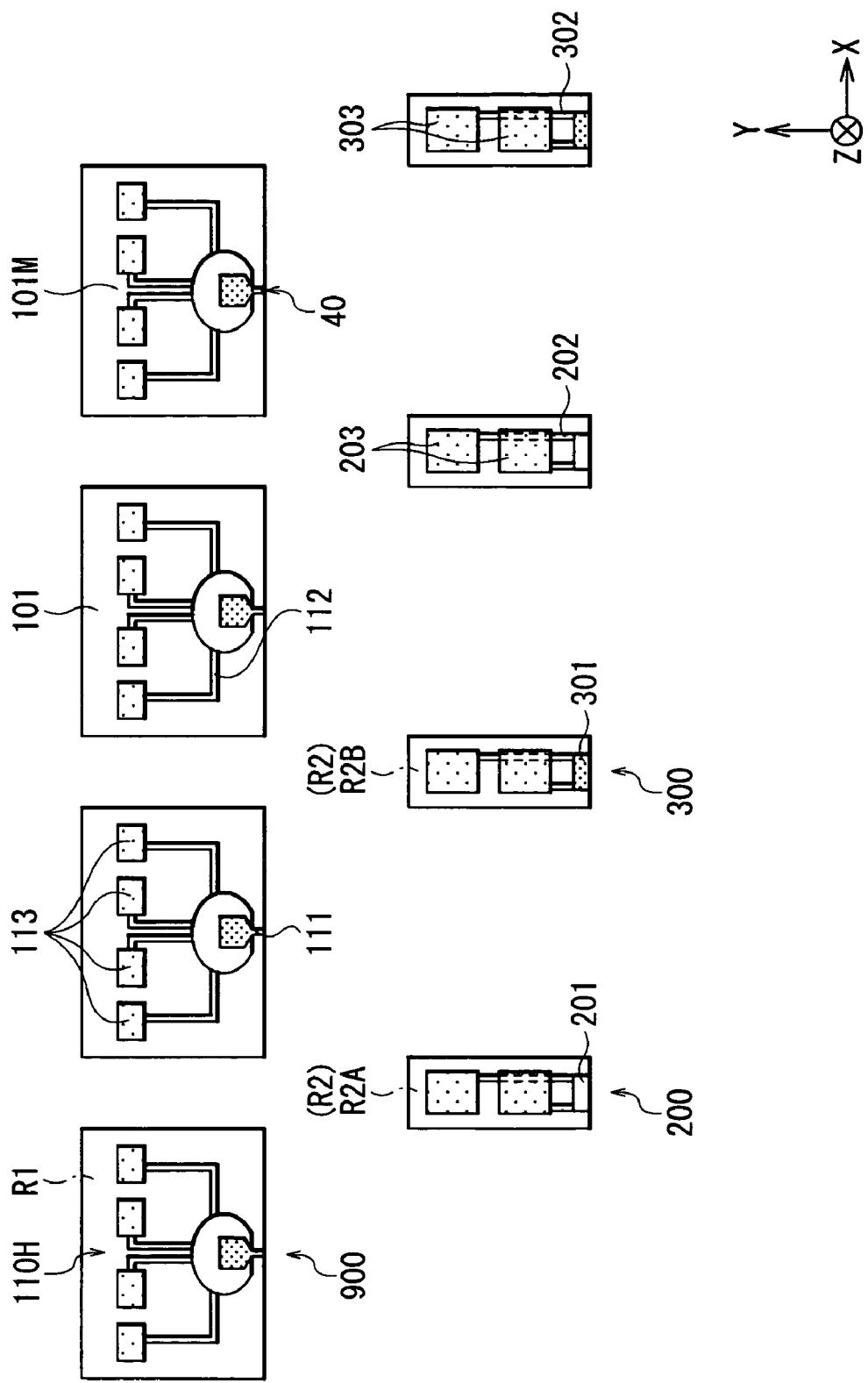
FIG. 22 is a plan view illustrating a manufacturing procedure subsequent to the procedure shown in FIG. 19.

Next, with reference to FIGS. 1 to 22, the method of manufacturing a thin film magnetic head by using the thin film magnetic head structure of the invention will be described. FIGS. 13 to 22 are diagrams for explaining the thin film magnetic head manufacturing method. FIG. 13 shows the flow of processes for manufacturing a thin film magnetic head. FIGS. 14 to 22 illustrate a concrete procedure of manufacturing a thin film magnetic head. FIGS. 14, 19, and 22 are plan views corresponding to FIG. 2. FIG. 20 shows a sectional configuration corresponding to FIG. 4. FIG. 21 shows a configuration in plan view corresponding to FIG. 6.

At the time of manufacturing a thin film magnetic head, the thin film magnetic head structure 100 shown in FIGS. 1 to 6 is prepared. After that, the thin film magnetic head structure 100 is diced along the cut lines C1 shown in FIG. 2, that is, the thin film magnetic head structure 100 is diced along the direction of arrangement of the plurality of thin film magnetic head precursors 110, thereby forming a plurality of thin film magnetic head bars 600 as shown in FIG. 14 (step S101 in FIG. 13). The thin film magnetic head bar 600 is a bar structure obtained by dicing the thin film magnetic head structure 100 along the cut lines C1, that is, by dividing the thin film magnetic head structure 100 into a plurality of pieces along the cut lines C1. Each thin film magnetic head bar 600 includes: the plurality of thin film magnetic head precursors 110 which are provided in the series of regions R1 and will become thin film magnetic heads 110H (refer to FIG. 19) to be described later by being subjected to a polishing process in a post process; the plurality of RLG sensors 200 for the reproducing head portions which are provided in the series of regions R2A and used for controlling the progress of the polishing process on the reproducing head portions 111A (refer to FIG. 4); and the plurality of RLG sensors 300 for the recording head portions which are provided in the series of regions R2B and used for controlling the progress of the polishing process on the recording head portion 111B (refer to FIG. 4). Although not shown in FIG. 14, each thin film magnetic head bar 600 includes, for example, the thin film magnetic head precursors 110, the RLG sensors 200 for the reproducing head portions, and the RLG sensors 300 for the recording head portions and, in addition, the M sensors 400 (refer to FIG. 3) provided in place of the RLG sensors 200 for the reproducing head portions in part of the regions R2A.

One of the two surfaces (cut faces) formed in the thin film magnetic head bar 600 which is formed by dicing the thin film magnetic head structure 100 along the cut lines C1, in which the stacked structure 111 and the resistance films 201 and 301 are exposed is the cut surface 101K1 which will be subjected to a polishing process in a post process and will become the air bearing surface. The other surface in which the stacked structure 111 and the resistance films 201 and 301 are not exposed is the cut surface 101K2 used for fixing the thin film magnetic head bar 600 in a post process. A portion (region R3) formed between the thin film magnetic head bars 600 when the thin film magnetic head structure 100 is cut along the cut lines C1, that is, a portion (excessive bar 601) in which none of the thin film magnetic head precursor 110, the RLG sensor 200 for the reproducing head portion, and the RLG sensor 300 for the recording head portion is provided is an unnecessary part which is not used in a post process, so that it is discarded as necessary.

Figure 15:
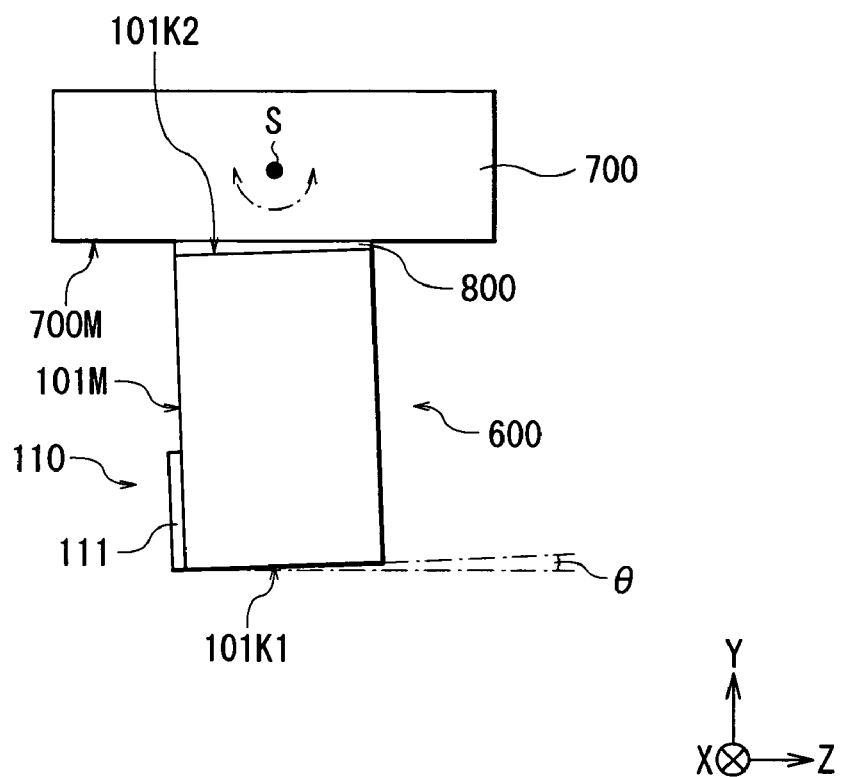
FIG. 15 is a side view illustrating a manufacturing procedure subsequent to the procedure shown in FIG. 14.

Subsequently, to form the air bearing surface by performing the polishing process on the thin film magnetic head bar 600, the thin film magnetic head bar 600 is fixed by using a fixing jig. Concretely, for example, as shown in FIG. 15, by attaching a cut surface 101K2 of the thin film magnetic head bar 600 to one surface (a surface 700M to be fixed) of a fixing jig 700 via an adhesive 800, the thin film magnetic head bar 600 is fixed to the fixing jig 700. FIG. 15 shows a side-face configuration of the case where the thin film magnetic head bar 600 is fixed to the fixing jig 700 and, similarly, FIGS. 16 to 18 which will be described later show side-face configurations corresponding to FIG. 15. The fixing jig 700 is a jig used for fixing the thin film magnetic head bar 600 at the time of performing the polishing process and has, for example, a not-shown screw for angle adjustment. By operating the screw, the fixing jig 700 can turn around the axis S of rotation (the axis parallel to the X axis). At the time of fixing the thin film magnetic head bar 600 to the fixing jig 700, for example, a double-faced adhesive tape is used as the adhesive 800. FIG. 15 shows the case where when the thin film magnetic head bar 600 is adhered to the fixing jig 700 via the adhesive 800, the cut surface 101K1 of the thin film magnetic head bar 600 is unintentionally tilted from the surface 700M to be fixed of the fixing jig 700 only by an angle (tilt angle) θ due to a human error.

Subsequently, as shown in FIGS. 16 to 19, by using the plurality of RLG sensors 200 for the reproducing head portions and the plurality of RLG sensors 300 for the recording head portions provided for the thin film magnetic head bar 600, an electric resistance value R1 (first electric resistance value) between the resistance films 201 or between the resistance films 301 and an electric resistance value R2 (second electric resistance value) between the resistance film 201 and the resistance film 301 are detected. The air bearing surface 40 is formed by polishing the thin film magnetic head precursor 110 together with the wafer 101 of the thin film magnetic head bar 600 while controlling the progress of the polishing process on the basis of the electric resistance values R1 and R2, thereby forming the thin film magnetic head 110H. Concretely, the thin film magnetic head bar 600 is polished while grasping the polishing amount on the basis of changes in the electric resistance values R1 and R2 according to the polishing amount. To be specific, with reference to FIG. 4, on the basis of the electric resistance values R1 and R2, the reproducing head portion 111A is polished so that the dimension of the MR device 6 in the extension direction of the MR device 6 (so-called MR height) becomes a predetermined dimension, and the recording head portion 111B is polished so that the dimension of the front end portion 11A in the extension direction of the magnetic pole layer 20 (so-called neck height) becomes a predetermined dimension. The work of detecting the electric resistance values R1 and R2 is done by using, for example, a computing process of a computer. The detailed procedure of the polishing process is as follows.

Figure 16:
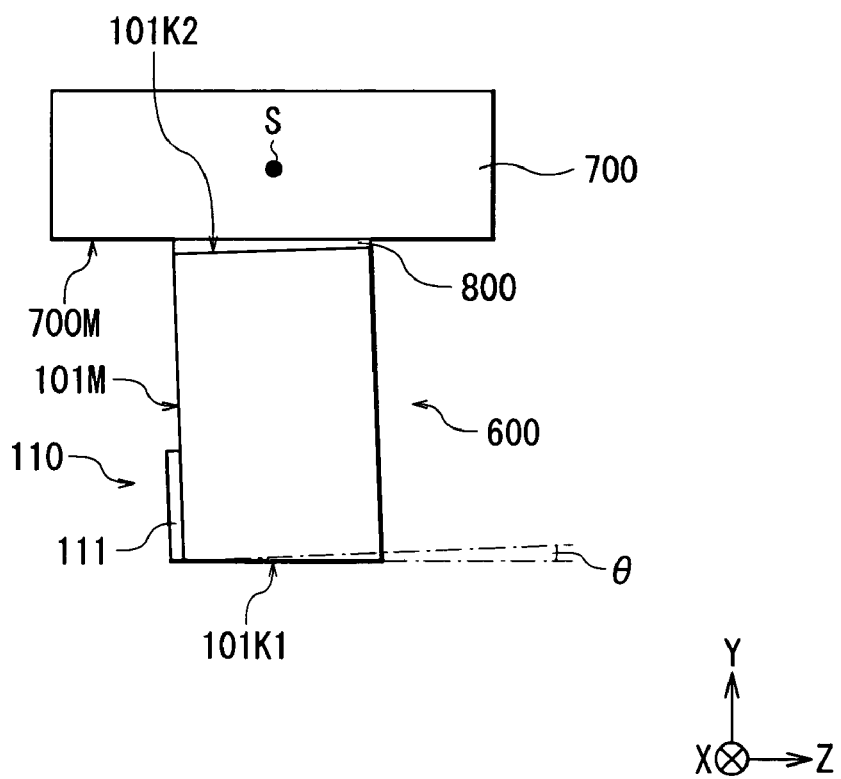
FIG. 16 is a side view illustrating a manufacturing procedure subsequent to the procedure shown in FIG. 15.

First, for example, while detecting the electric resistance value between the resistance films 201 as the electric resistance value R1 by using the plurality of RLG sensors 200 for the reproducing head portions, as shown in FIG. 16, the thin film magnetic head bar 600 is pre-polished (step S102 in FIG. 13). Concretely, by performing the polishing process on the cut surface 101K1 of the thin film magnetic head bar 600, the stacked structure 111 in the thin film magnetic head precursor 110 and the resistance film 201 in the RLG sensor 200 for the reproducing head portion are polished together with the wafer 101. Obviously, by performing the polishing process on the cut surface 101K1 of the thin film magnetic head bar 600, the M sensor 400 and the resistance film 301 in the RLG sensor 300 for the recording head portion are also polished together with the resistance film 201. The "pre-polish" is, different from fine polish (finishing polish which will be described later) for finally forming the air bearing surface 40, rough polish executed as preparation for executing the fine polish.

At the time of pre-polishing the thin film magnetic head bar 600, for example, a series of RLG sensors 200 for the reproducing head portions are used to detect the electric resistance value R1 in each position (the position in which each of the RLG sensors 200 for the reproducing head portions is disposed) in the thin film magnetic head bar 600, that is, the electric resistance value between the resistance films 201, and the progress of the polishing process is controlled so that the electric resistance values of the resistance films 201 are equalized. More specifically, by using the phenomenon such that when the resistance film 201 is polished and its dimension changes, the electric resistance value of the resistance film 201 changes according to the dimensional change, the polishing amount is adjusted so that the electric resistance values of the resistance films 201 become equal to each other in the direction in which the plurality of thin film magnetic head precursors 110 are arranged. In the pre-polishing process, for example, the polishing process is performed on the thin film magnetic head bar 600 on the basis of the electric resistance value of each resistance film 201 until the MR height MH becomes a pre-dimension HM0 larger than a target dimension HM1 of the MR height MH of the reproducing head portion 111A (HM0>HM1) in the thin film magnetic head 110H to be obtained finally by the manufacture. Since the resistance film 301 is also polished when the resistance film 201 is polished as described above, assuming that the resistance film 301 is polished only by a polishing amount equivalent to a polishing amount of the resistance film 201, in the thin film magnetic head 110H to be finally obtained by the manufacture, the neck height NH is supposed to be a pre-dimension HN0 larger than the target dimension HN1 (HN0>HN1) of the neck height NH of the recording head portion 111B. In the pre-polishing process, variations in the polishing amount of the reproducing head portion 111A are suppressed among the thin film magnetic head precursors 110.

Referring now to FIG. 3, a concrete polishing procedure using the plurality of RLG sensors 200 for the reproducing head portions will be briefly described. As shown in FIG. 3, when it is assumed that lead resistance is RL, crowding resistance is C, and sheet resistance is RS in the case where the resistance film 201A has the resistance RA, width WA, and height HA, the resistance film 201B has the resistance RB, width WB=WA, and height HB=HA−10 (μm), and the resistance film 201C has the resistance RC, width WC=WA+10 (μm), and height HC=HA−10 (μm), the resistances RA, RB, and RC are expressed as RA=RL+(C+S×WA)/HA, RB=RL+(C+S×WA)(HA−10), and RC=RL+(C+S×WA+S×10)(HA−10). In this case, when the ternary simultaneous equations related to the resistances RA, RB, and RC are solved, the lead resistance RL, sheet resistance S, and virtual resistance RV (=C+S×WA) are led as RL=RA+(HA−10)(RA−RB)/10, S=(HA−10)(RC−RB)/10, and RV(=C+S×WA)=−HA(HA−10)(RA−RB)/10. Consequently, the lead resistance RL, sheet resistance S, and virtual resistance RV are known before the polishing process. Since there is generally the relation of R1=RL+RV/MH among the electric resistance value R1, lead resistance RL, virtual resistance RV, and MR height MH detected by using the plurality of RLG sensors 200 for the reproducing head portions, by detecting the electric resistance value R1 using the relation in the case where the lead resistance RL and the virtual resistance RV are known, the MR height MH can be calculated. Thus, when the MR height MH is calculated by detecting the electric resistance value R1 at predetermined time intervals in the polishing process, the polishing process can be executed while grasping the MR height MH in process of polishing. Therefore, the polishing process can be performed until the polishing amount becomes a predetermined polishing amount. The process of calculating the MR height MH is executed by using the computing process of a computer as described above.

A method of manufacturing a thin film magnetic head will now be described. After the thin film magnetic head bar 600 is pre-polished, the electric resistance value between the resistance films 201 and 301 is detected as the electric resistance value R2 by using the plurality of RLG sensors 200 for the reproducing head portions and the plurality of RLG sensors 300 for the recording head portions, thereby detecting a tilt of the polished surface of the thin film magnetic head bar 600 (step S103 in FIG. 13). The "tilt of the polished surface of the thin film magnetic head bar 600" is a tilt of the thin film magnetic head bar 600 according to the tilt angle θ shown in FIG. 15, that is, a tilt of the polished surface (cut surface 101K1) with respect to a reference surface (cut surface 101K2) and is the cause of a deviation amount of the neck height NH (an amount of deviation from the pre-dimension HN0).

At the time of detecting the tilt of the polished surface of the thin film magnetic head bar 600, for example, the electric resistance values R1 of each resistance film 201 are detected by using the series of RLG sensors 200 for the reproducing head portions, and the electric resistance values in each position (the position in which each RLG sensor 300 for the recording head portion is disposed) in the thin film magnetic head bar 600, that is, the electric resistance values R2 between each resistance film 301 are detected by using the series of the RLG sensors 300 for the recording head portions. On the basis of the electric resistance values R1 and R2, the tilt of the posture of the thin film magnetic head bar 600 is detected. Specifically, the polishing amounts of the reproducing head portion 111A and the recording head portion 111B are grasped on the basis of the electric resistance values R1 and R2. After that, the difference between the polishing amount of the reproducing head portion 111A and the polishing amount of the recording head portion 111B is calculated and, on the basis of the difference, the tilt angle θ of the thin film magnetic head bar 600 is specified. For example, in the case where the thin film magnetic head bar 600 is pre-polished as shown in FIG. 16 in a state where the thin film magnetic head bar 600 is tilted only by the tilt angle θ as shown in FIG. 15, the polishing amount on the stacked structure 111 on the leading side (on the side of the reproducing head portion 111A) becomes larger than that on the trailing side (on the side of the recording head portion 111B), so that the polishing amount of the recording head portion 111B becomes larger than that of the reproducing head portion 111A.

Subsequently, the posture of the thin film magnetic head bar 600 is adjusted on the basis of the tilt angle θ, thereby adjusting the tilt of the polished surface of the thin film magnetic head bar 600 (step S104 in FIG. 13).

Figure 17:
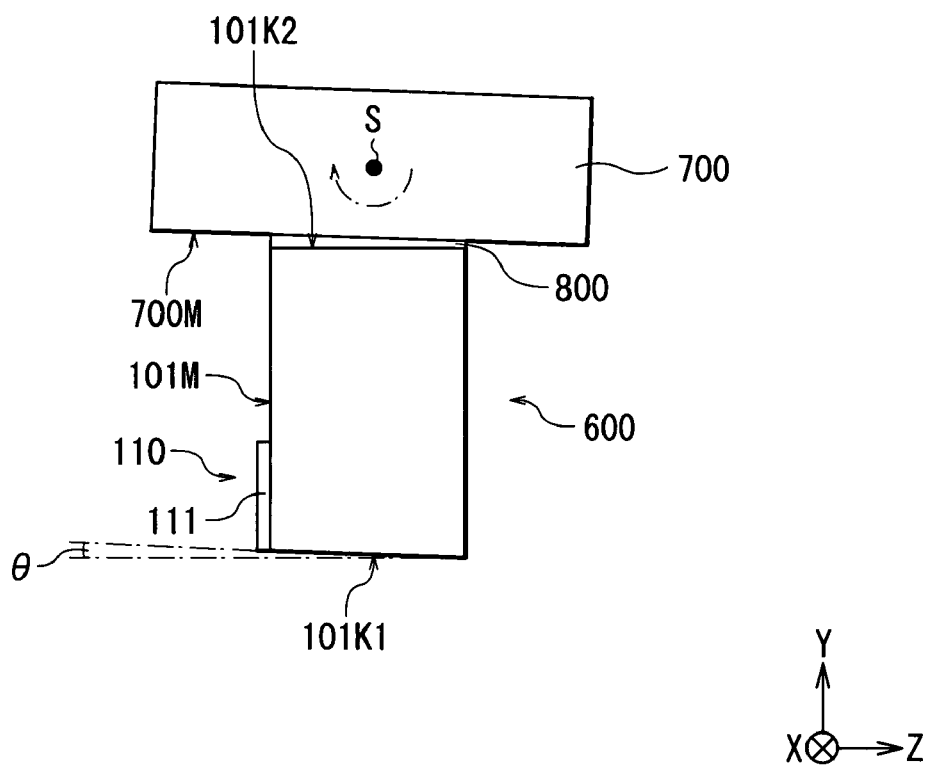
FIG. 17 is a side view illustrating a manufacturing procedure subsequent to the procedure shown in FIG. 16.

At the time of adjusting the tilt of the polished surface of the thin film magnetic head bar 600, the posture of the thin film magnetic head bar 600 is changed by turning the fixing jig 700 around the rotation axis S as a center so that, in the case of performing the polishing process on the thin film magnetic head bar 600 in a post process, the MR height MH of the reproducing head portion 111A finally becomes the target dimension HM1 and the neck height NH of the recording head portion 111B becomes the target dimension HN1. For example, as shown in FIG. 16, since the cut surface 101K1 of the thin film magnetic head bar 600 is inclined from the cut surface 101K2 only by the tilt angle θ, by turning the fixing jig 700 clockwise only by the angle θ so as to correct the tilt angle θ, as shown in FIG. 17, the thin film magnetic head bar 600 is intentionally inclined so that the cut surface 101K1 is inclined in the direction opposite to the surface 700M to be fixed of the fixing jig 700 (in the opposite inclined direction to the incline direction shown in FIG. 15).

Figure 18:
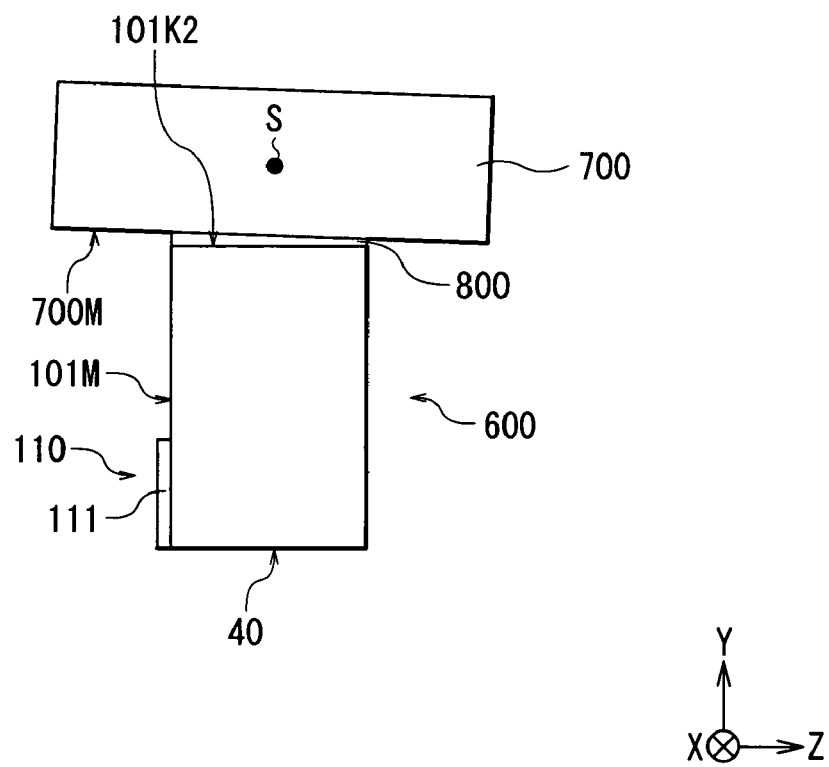
FIG. 18 is a side view illustrating a manufacturing procedure subsequent to the procedure shown in FIG. 17.
Figure 19:
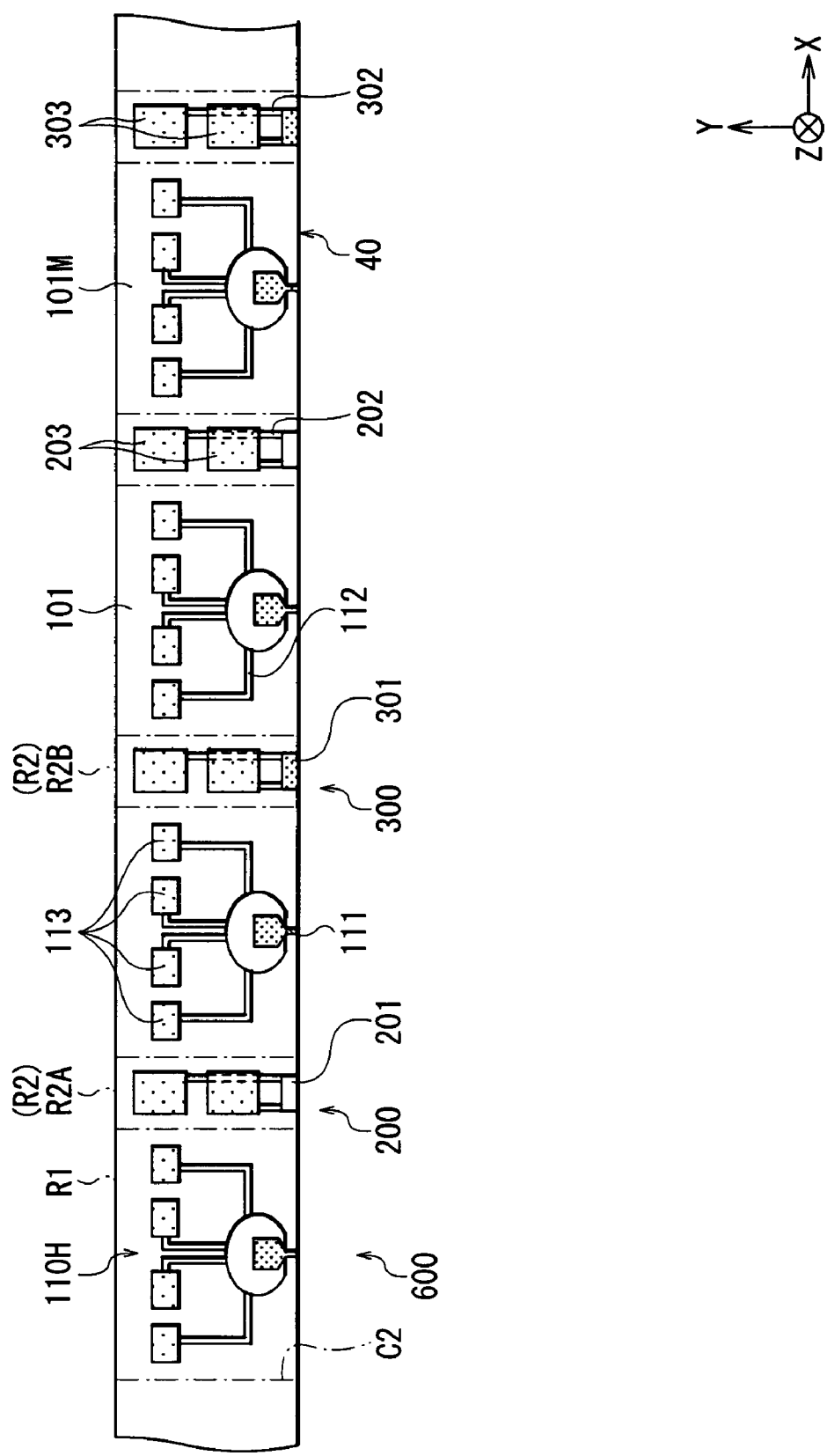
FIG. 19 is a plan view corresponding to a side configuration shown in FIG. 18.

Finally, for example, while detecting the electric resistance value between each resistance film 201 as the electric resistance value R1 by using the plurality of RLG sensors 200 for the reproducing head portions, as shown in FIG. 18, the thin film magnetic head bar 600 is subjected to finish polishing, thereby forming the air bearing surface 40 (step S105 in FIG. 13). Concretely, by subsequently performing the polishing process on the cut surface 101K1 of the thin film magnetic head bar 600, the stacked structure 111 in the thin film magnetic head precursor 110 and the resistance film 201 in the RLC sensor 200 for the reproducing head portion are polished together with the wafer 101. Obviously, by performing the polishing process on the cut surface 101K1 of the thin film magnetic head bar 600, the M sensor 400 and the resistance film 301 in the RLG sensor 300 for the recording head portion are also polished together with the resistance film 201. The "finish-polishing" is fine polishing for forming the air bearing surface 40 finally.

At the time of performing finish-polishing on the thin film magnetic head bar 600, for example, in a manner similar to the case where the thin film magnetic head bar 600 is pre-polished, by detecting the electric resistance value between each resistance film 201 by using the series of RLG sensors 200 for the reproducing head portions, the progress of the polishing process is controlled so that the electric resistance values of each resistance film 201 are equalized. In the finish-polishing process, for example, on the basis of the electric resistance value of each resistance film 201, the polishing process is performed on the thin film magnetic head bar 600 so that the MR height MH of the reproducing head portion 111A becomes the target dimension HM1. In this case, as described above, the recording head portion 111B is also polished together with the reproducing head portion 111A in a state where the tilt of the polished surface of the thin film magnetic head bar 600 is adjusted. Consequently, at the time point the MR height MH of the reproducing head portion 111A reaches the target dimension HM1, the neck height NH of the recording head portion 111B also reaches the target dimension HN1. In the finish-polishing process, variations in the polishing amounts of the reproducing head portions 111A among the thin film magnetic head precursors 110 are suppressed, and variations of the polishing amounts between the reproducing head portion 111A and the recording head portion 111B are suppressed. By the finish-polishing process, the cut surface 101K1 of the thin film magnetic head bar 600 becomes the air bearing surface 40. Therefore, as shown in FIG. 19, the thin film magnetic head 110H is completed so as to include both of the reproducing head portion 111A and the recording head portion 111B as the thin film magnetic head precursor 110 in which the air bearing surface 40 is formed. A sectional configuration (sectional configuration along an YZ plane) and a planar configuration (configuration seen from above in the Z-axis direction) of the thin film magnetic head 110H are as shown in FIGS. 20 and 21, respectively.

After completion of the thin film magnetic head 110H, the thin film magnetic head bar 600 is cut along the cut lines C2 shown in FIG. 19, that is, the thin film magnetic head bar 600 is diced into the plurality of thin film magnetic heads 110H. In such a manner, a plurality of magnetic head sliders 900 are formed as shown in FIG. 22 (step S106 in FIG. 13). The magnetic head slider 900 is mounted as a magnetic device capable of performing both magnetic reproducing process and recording process on a magnetic recording apparatus such as a hard disk drive. In the case of forming the plurality of magnetic head sliders 900 by dicing the thin film magnetic head bar 600, since the plurality of RLG sensors 200 for the reproducing head portions and the plurality of RLG sensors 300 for the recording head portions are already used, they are discarded as necessary.

In the thin film magnetic head manufacturing method, by cutting the thin film magnetic head structure 100 described above in the foregoing embodiment, the thin film magnetic bar 600 is formed. After that, while detecting the electric resistance values R1 and R2 by using the RLG sensors 200 for the reproducing head portions and the RLG sensors 300 for the recording head portions, the polishing process is performed on the thin film magnetic head bar 600 to form the air bearing surface 40. More concretely, the thin film magnetic head bar 600 is pre-polished while detecting the electric resistance value R1 by using the RLG sensors 200 for the reproducing head portions. Subsequently, the electric resistance values R1 and R2 are detected by using both of the RLG sensors 200 for the reproducing head portions and the RLG sensors 300 for the recording head portions and the tilt of the polished surface of the thin film magnetic head bar 600 is adjusted. After that, while detecting the electric resistance value R1 by using the RLG sensors 200 for the reproducing head portions again, the thin film magnetic head bar 600 is finish-polished. As a result, the thin film magnetic head 110H is manufactured so as to include both of the reproducing head portion 111A and the recording head portion 111B. In this case, as described above, the progress of the polishing process on each of the reproducing head portion 111A and the recording head portion 111B is properly controlled in the process of forming the air bearing surface 40 by the polishing process. Consequently, the MR height MH of the reproducing head portion 111A reaches the target dimension HM1, and the neck height NH of the recording head portion 111B reaches the target dimension HN1. Therefore, in the case where the thin film magnetic head 110H is manufactured by forming the air bearing surface 40, the MR height MH can be determined to be the target dimension HM1, and the neck height NH can be determined to be the target dimension HN1. Thus, both of the MR height MH and the neck height NH can be determined with high precision.

Figure 23:
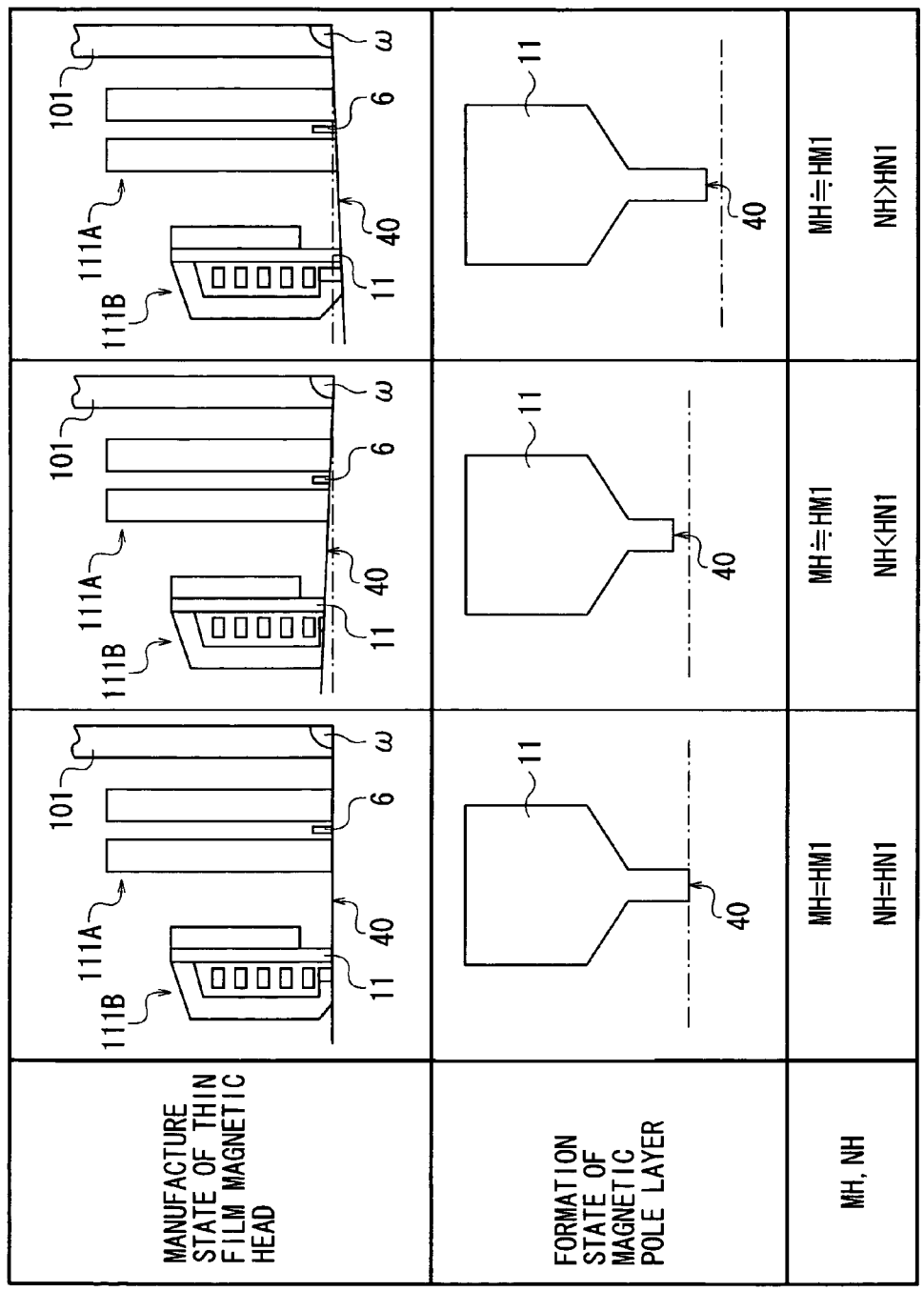
FIGS. 23A to 23C are diagrams showing advantages of the thin film magnetic head manufacturing method of the invention.

Effects obtained on the basis of the thin film magnetic head manufacturing method will be concretely described as follows. FIGS. 23A to 23C are provided for explaining advantages of the thin film magnetic head manufacturing method of the invention. FIG. 23A illustrates the advantages of the thin film magnetic head manufacturing method of the invention, and FIGS. 23B and 23C show problems of a thin film magnetic head manufacturing method as a comparative example of the thin film magnetic head manufacturing method of the invention. The thin film magnetic head manufacturing method of the comparative example has processes similar to those of the thin film magnetic head manufacturing method of the invention except for the point that the RLG sensor 300 for the recording head portion is not used but only the RLG sensor 200 for the reproducing head portion is used in a manner different from the thin film magnetic head manufacturing method of the invention in which both of the RLG sensor 200 for the reproducing head portion and the RLG sensor 300 for the recording head portion are used. In FIGS. 23A to 23C, a side-face configuration (side-face configuration schematically showing the sectional configuration shown in FIG. 20) of the thin film magnetic head is shown as a "manufacturing state of a thin film magnetic head" and a planar configuration of the magnetic pole layer (a planar configuration schematically showing the planar configuration of FIG. 21) is shown as a "formation state of the magnetic pole layer" with respect to each of the thin film magnetic head manufacturing method of the invention and the thin film magnetic head manufacturing method of the comparative example. In FIGS. 23A to 23C, the MR height MH and the neck height NH of the thin film magnetic head are also shown. Each of alternate long and short dash lines shown in FIGS. 23A to 23C with respect to the "manufacturing state of the thin film magnetic head" and the "formation state of the magnetic pole layer" indicates a target formation position of the air bearing surface 40.

In the thin film magnetic head manufacturing method of the comparative example using only the RLG sensor 200 for the reproducing head portion (refer to FIGS. 23B and 23C), the MR height MH can be determined to be almost the target dimension HM1 by manufacturing the thin film magnetic head 110H by polishing the thin film magnetic head bar 600 while controlling the progress of the polishing process by using the RLG sensor 200 for the reproducing head portion, but it is difficult to determine the neck height NH to be the target dimension HN1. As an example has been described above with reference to FIGS. 15 and 16, at the time of fixing the fixing jig 700, if the thin film magnetic head bar 600 is inclined, the polished surface is inclined due to the tilt of the thin film magnetic head bar 600. Consequently, even if the thin film magnetic head bar 600 is polished so that the MR height MH becomes the target dimension HM1, the neck height NH does not become the target dimension HM1. Concretely, for example, when the recording head portion 111B is excessively polished in a state where the reproducing head portion 111A is polished so that the MR height MH becomes the target dimension HN1, as shown in FIG. 23B, the length of the formed magnetic pole layer 11 becomes shorter unintentionally due to the tilt of the air bearing surface 40 in such a manner that the recording head portion 111B is receded more than the reproducing head portion 111A. Therefore, the MR height MH becomes almost the target dimension HM1 (MH≈HM1) but the neck height NH becomes shorter than the target dimension HN1 (NH<HN1). For example, if the polishing amount on the recording head portion 111B is insufficient in a state where the reproducing head portion 111A is polished so that the MR height MH becomes the target dimension HM1, as shown in FIG. 23C, the formed magnetic pole layer 11 becomes long unintentionally due to the tilt of the air bearing surface 40 in such a manner that the recording head portion 111B is projected more than the reproducing head portion 111A. Therefore, the MR height MH becomes almost the target dimension HM1 (MH≈HM1) but the neck height NH becomes longer than the target dimension HN1 (NH>HN1).

In contrast, in the thin film magnetic head manufacturing method of the invention (refer to FIG. 23A) using both of the RLG sensor 200 for the reproducing head portion and the RLG sensor 300 for the recording head portion, the thin film magnetic head 110H is manufactured by polishing the thin film magnetic head bar 600 while controlling the progress of the polishing process. Consequently, the MR height MH can be determined to be the target dimension HM1, and the neck height NH can be determined to be the target dimension HN1 for the following reason. Even if the thin film magnetic head bar 600 tilts when it is fixed to the fixing jig 700, the tilt of the polished surface of the thin film magnetic head bar 600 is detected and is corrected during polish (between the pre-polishing process and the finish-polishing process) by using the RLG sensor 200 for the reproducing head portion and the RLG sensor 300 for the recording head portion. Concretely, for example, in a state where the reproducing head portion 111A is polished so that the MR height MH becomes the target dimension HM1, the recording head portion 111B is polished so that the neck height NH becomes the target dimension HN1. As a result, as shown in FIG. 23A, the length of the formed magnetic pole layer 11 is properly determined on the basis of proper formation of the air bearing surface 40, so that the MR height MH is determined to be the target dimension HM1 (MH=HM1) and the neck height NH is also determined to be the target dimension HN1 (NH=HN1). Therefore, in the thin film magnetic head manufacturing method of the invention, both of the MR height MH and the neck height NH can be determined with high precision.

In particular, in the thin film magnetic head manufacturing method, the thin film magnetic head bar 600 is pre-polished (lapped) by using the RLG sensor 200 for the reproducing head portion and, subsequently, the tilt of the polished surface of the thin film magnetic head bar 600 is adjusted by using both of the RLG sensor 200 for the reproducing head portion and the RLG sensor 300 for the recording head portion. After that, the thin film magnetic head bar 600 is finish-polished (fine-polished) by using the RLG sensor 200 for the reproducing head portion. Consequently, the thin film magnetic head bar 600 is polished by a relatively large polishing amount in short time by using the lapping process and is polished with high precision by a relatively small polishing amount by using the finish-polishing process. Therefore, at the time of manufacturing the thin film magnetic head 110H by forming the air bearing surface 40 by polishing the thin film magnetic head bar 600, the thin film magnetic head 110H can be manufactured with high precision in short time.

In the thin film magnetic head manufacturing method, the thin film magnetic head bar 600 is pre-polished by using the RLG sensor 200 for the reproducing head portion and is finish-polished by using the RLG sensor 200 for the reproducing head portion again. The invention, however, is not limited to the method. As long as the thin film magnetic head 110H can be formed so that both of the MR height MH and the neck height NH can be determined with high precision, the kind of the RLG sensor used at the time of performing the pre-polishing process and the finish-polishing process can be freely changed. Concretely, for example, in the case of performing the pre-polishing process and the finish-polishing process, the RLG sensor 300 for the recording head portion may be used in place of the RLG sensor 200 for the reproducing head portion. Alternately, both of the RLG sensor 200 for the reproducing head portion and the RLG sensor 300 for the recording head portion may be used.

EXAMPLE

An example of the invention will now be described.

A thin film magnetic head structure was manufactured by using the method of manufacturing the thin film magnetic head structure described in the foregoing embodiment and, after that, a thin film magnetic head was manufactured by using the thin film magnetic head structure by the thin film magnetic head manufacturing method. The following series of results were obtained.

Figure 24:
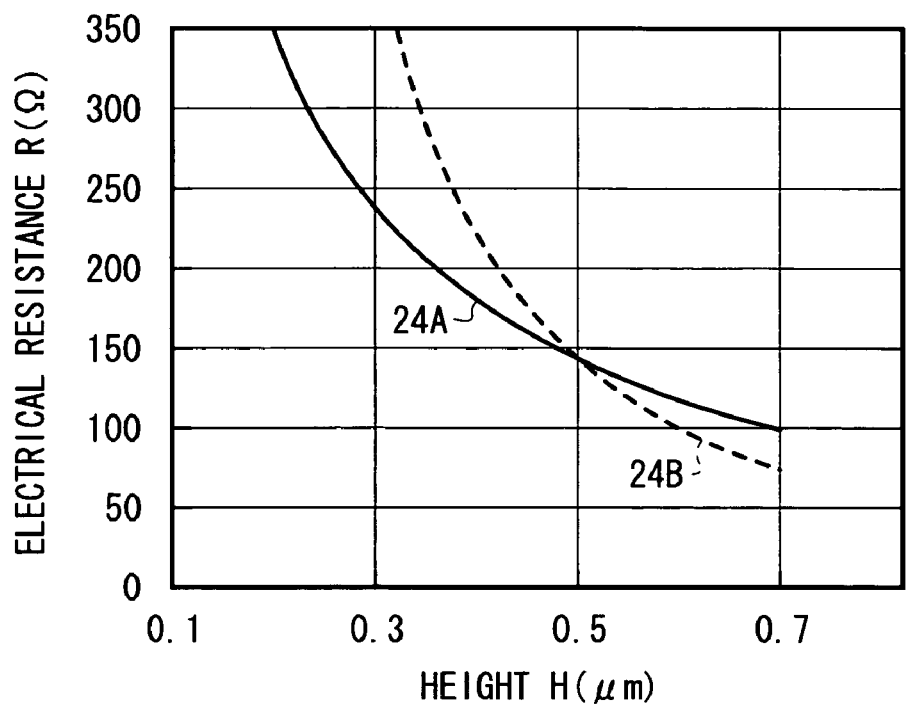
FIG. 24 is a diagram showing a resistance characteristic of a first resistive film.
Figure 25:
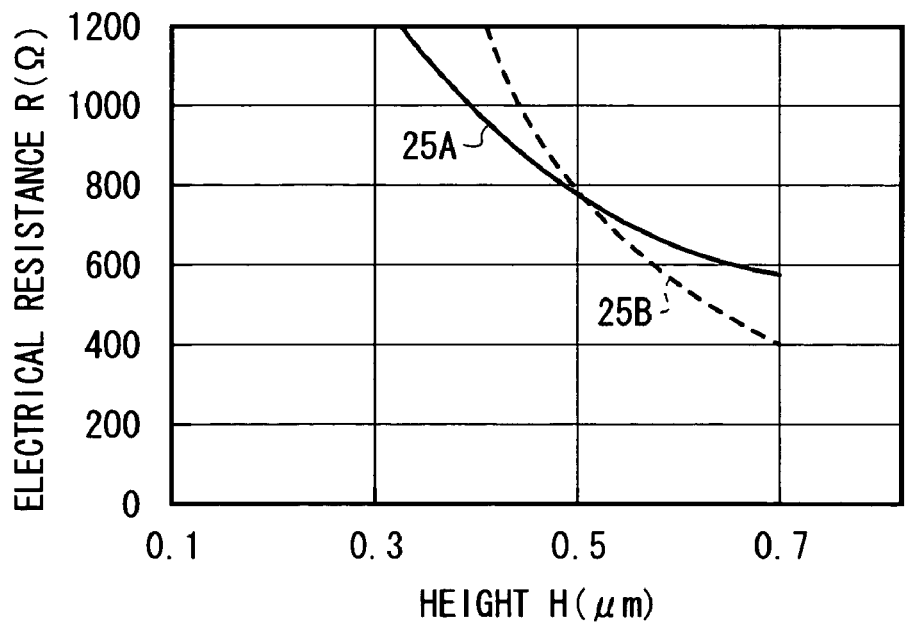
FIG. 25 is a diagram showing a resistance characteristic of a second resistive film.

First, electric characteristics of the RLG sensor for the recording head portion provided for the thin film magnetic head structure of the invention were examined and the results shown in FIGS. 24 and 25 were obtained. FIGS. 24 and 25 show resistance characteristics of the resistance films of the RLG sensor for the recording head portion. FIG. 24 shows the resistance characteristics of the first resistance film and FIG. 25 shows the resistance characteristics of the second resistance film. In FIGS. 24 and 25, the "horizontal axis" indicates the height H (=height of the resistance film; μm), and the "vertical axis" indicates electrical resistance R (=electrical resistance of the resistance film; Ω). As the material of the first resistance film shown in FIG. 24, ruthenium (Ru), permalloy (NiFe) or cobalt iron nickel (CoFeNi) alloy was used and the resistance film had resistivity=18 μΩcm, thickness=0.05 μm, and width=20 μm. As the material of the second resistance film shown in FIG. 25, titanium (Ti) was used, and the resistance film had resistivity=77 μΩm, thickness=0.04 μm, and width=20 μm. Each of "24A and 25A" shown in FIGS. 24 and 25 indicates a characteristic patterns showing a change in the electrical resistance R with respect to a change in the height H, and each of "24B and 25B" indicates sensitivity ($\times 10^{-2}\Omega/0.005$ μm) calculated on the basis of the characteristic patterns expressed as "24A and 25A".

As understood from the results shown in FIGS. 24 and 25, in both of the cases of the first and second resistance films, the electrical resistance R changed as the height H of the resistance film changed. Concretely, as the height H decreased, the electrical resistance R increased. In this case, based on the difference between the resistivity of the first resistance film and that of the second resistance film, the sensitivity (resistance change rate) of the second resistance film was higher than that of the first resistance film. From the above, it was recognized that in the thin film magnetic head manufacturing method of the invention, by performing the polishing process on the thin film magnetic head structure to form the air bearing surface and to manufacture the thin film magnetic head while using the RLG sensor for the recording head portion, a dimensional change based on a change in resistance of the resistance film, that is, the progress of the polishing process can be suppressed.

Subsequently, precision of processing at the time of manufacturing a thin film magnetic head by using the thin film magnetic head manufacturing method of the invention was examined and the results shown in Table 1 were obtained. Table 1 shows the precision of processing on the thin film magnetic head. In Table 1, the angle between an extended plane of the wafer 101 (a plane along the extension direction of the wafer 101) shown in FIGS. 23A to 23C and the air bearing surface 40 is shown as "process angle (d" and a standard deviation of the process angle c is shown as "standard deviation σ". The result of obtaining the process precision of the thin film magnetic head manufactured by using the thin film magnetic head manufacturing method of the invention is shown as the "present invention" in Table 1. The result of obtaining the process angle w and the standard deviation σ of the thin film magnetic head manufactured by using the thin film magnetic head manufacturing method of the comparative example described by referring to FIGS. 23B and 23C is also shown as "comparative example" in Table 1.

TABLE 1

|  | Process angle ω (°) | Standard deviation σ (—) |
| --- | --- | --- |
| Present invention | 90.0 ± 0.3 | <0.06 |
| Comparative example | 90.0 ± 2.0 | 0.2 to 0.3 |

As understood from the results shown in Table 1, the process angle ω and the standard deviation a of the present invention were smaller than those of the comparative example. Concretely, in the comparative example, the process angle ω was 90.0°±2.0° and the standard deviation σ was 0.2 to 0.3. In contrast, in the invention, the process angle ω was 90.0°±0.3° and the standard deviation ay was smaller than 0.06. It was consequently confirmed that by manufacturing the thin film magnetic head by using the thin film magnetic head manufacturing method of the invention, the process angle (o after the polishing process became closer to the right angle, that is, the polishing amount of the reproducing head portion and the polishing amount of the recording head portion became almost equal to each other, so that both of the MR height MH and the neck height NH could be determined with high precision as shown in FIG. 23A.

Although the invention has been described above by the embodiment and the example, the invention is not limited to the foregoing embodiment and the example but can be variously modified. Concretely, for example, although the case of applying the invention to a shield-type head has been described in the foregoing embodiment and example, the invention is not always limited to the case but may be applied to a head of a single magnetic pole type. Although the case of applying the invention to a composite thin film magnetic head has been described in the foregoing embodiment and example, the invention is not always limited to the case but can be also applied to, for example, a thin film magnetic head for recording having an inductive magnetic transducer for writing and a thin film magnetic head having an inductive magnetic transducer for both recording and reproducing. Obviously, the invention can be also applied to a thin film magnetic head having a structure in which a device for writing and a device for reading are stacked in the reverse order.

Although the case of applying the invention to a thin film magnetic head of the perpendicular recording method has been described in the foregoing embodiment and example, the invention is not always limited to the case but can be also applied to a thin film magnetic head of a longitudinal recording method.

The thin film magnetic head structure according to the invention and the method of manufacturing the same can be applied to, for example, a method of manufacturing a thin film magnetic head to be mounted on a magnetic recording apparatus such as a hard disk drive for magnetically recording information onto a hard disk.

Obviously many modifications and variations of the present invention are possible in the light of the above teachings. It is therefore to be understood that within the scope of the appended claims, the invention may be practiced otherwise than as specifically described.

What is claimed is:

1. A thin film magnetic head structure comprising, on one of surfaces of a substrate:
    a plurality of thin film magnetic head precursors each including both of a reproducing head portion and a recording head portion, as precursors to become a plurality of thin film magnetic heads each including both of the reproducing head portion and the recording head portion and having a recording-medium-facing surface which faces a recoding medium;
    a plurality of first resistance film patterns used to control progress of a polishing process on the reproducing head portion at the time of forming the thin film magnetic head by forming the recording-medium-facing surface by polishing the substrate together with the thin film magnetic head precursor; and
    a plurality of second resistance film patterns used to control progress of a polishing process on the recording head portion at the time of forming the thin film magnetic head by forming the recording-medium-facing surface by polishing the substrate together with the thin film magnetic head precursor.

2. A thin film magnetic head structure according to claim 1, wherein the first resistance film pattern is used to grasp a polishing amount of the reproducing head portion on the basis of a change in its electrical resistance which changes according to the polishing amount, and the second resistance film pattern is used to grasp a polishing amount of the recording head portion on the basis of a change in its electrical resistance which changes according to the polishing amount.

3. A thin film magnetic head structure according to claim 1, wherein the plurality of thin film magnetic head precursors are arranged in a plurality of rows, and the plurality of first resistance film patterns and the plurality of second resistance film patterns are arranged in a plurality of rows in correspondence with the arrangement direction of the plurality of thin film magnetic head precursors.

4. A thin film magnetic head structure according to claim 1, wherein the thin film magnetic head precursors are disposed in a first region in one of the surfaces of the substrate, and the first and second resistance film patterns are disposed in a second region different from the first region in one of the surfaces of the substrate.

5. A thin film magnetic head structure according to claim 4, wherein the reproducing head portion has a stacked structure including a magneto-resistive effect device extending rearward from the recording-medium-facing surface and executing a reproducing process, the recording head portion has a stacked structure including a magnetic pole layer extending rearward from the recording-medium-facing surface, having a track width specifying part which specifies a recording track width of the recording medium, and executing a recording process, the first resistance film pattern is disposed in the same level as that of the magneto-resistive effect device in the reproducing head portion, and the second resistance film pattern is disposed in the same level as that of the magnetic pole layer in the recording head portion.

6. A thin film magnetic head structure according to claim 5, wherein the first resistance film pattern is used to grasp a polishing amount of the reproducing head portion so that the dimension of the magneto-resistive effect device in the extension direction of the magneto-resistive effect device becomes a predetermined dimension, and the second resistance film pattern is used to grasp a polishing amount of the recording head portion so that the dimension of the track width specifying part in the extension direction of the magnetic pole layer becomes a predetermined dimension.

7. A thin film magnetic head structure according to claim 5, wherein the first resistance film pattern is formed in parallel with the magneto-resistive effect device, and the second resistance film pattern is formed in parallel with the magnetic pole layer.

8. A thin film magnetic head structure according to claim 5, wherein the magnetic pole layer is constructed to emit a magnetic flux for magnetizing the recording medium in a direction orthogonal to the surface of the recording medium.

9. A method of manufacturing a thin film magnetic head structure, comprising:

a first step of forming a plurality of thin film magnetic head precursors each including both of a reproducing head portion and a recording head portion, as precursors to become a plurality of thin film magnetic heads each including both of the reproducing head portion and the recording head portion and having a recording-medium-facing surface which faces a recoding medium;

a second step of forming a plurality of first resistance film patterns so as to be able to control progress of a polishing process on the reproducing head portion at the time of forming the thin film magnetic head by forming the recording-medium-facing surface by polishing a substrate together with the thin film magnetic head precursor; and a third step of forming a plurality of second resistance film patterns so as to be able to control progress of a polishing process on the recording head portion at the time of forming the thin film magnetic head by forming the recording-medium-facing surface by polishing the substrate together with the thin film magnetic head precursor, the plurality of thin film magnetic head precursors, the plurality of first resistance film patterns, and the plurality of second resistance film patterns being formed on one of surfaces of the substrate.

10. A method of manufacturing a thin film magnetic head structure according to claim 9, wherein in the second step, the first resistance film pattern is formed so as to be able to grasp a polishing amount of the reproducing head portion on the basis of a change in its electrical resistance which changes according to the polishing amount, and in the third step, the second resistance film pattern is formed so as to be able to grasp a polishing amount of the recording head portion on the basis of a change in its electrical resistance which changes according to the polishing amount.

11. A method of manufacturing a thin film magnetic head structure according to claim 9, wherein in the first step, the plurality of thin film magnetic head precursors are formed so as to be arranged in a plurality of rows, and in the second and third steps, the plurality of first resistance film patterns and the plurality of second resistance film patterns are formed so as to be arranged in a plurality of rows in correspondence with the arrangement direction of the plurality of thin film magnetic head precursors.

12. A method of manufacturing a thin film magnetic head structure according to claim 9, wherein in the first step, the thin film magnetic head precursors are disposed in a first region in one of the surfaces of the substrate, and in the second and third steps, the first and second resistance film patterns are formed so as to be disposed in a second region different from the first region in one of the surfaces of the substrate.

13. A method of manufacturing a thin film magnetic head structure according to claim 12, wherein in the first step, the thin film magnetic head precursor is formed so that the reproducing head portion has a stacked structure including a magneto-resistive effect device extending rearward from the recording-medium-facing surface and executing a reproducing process, the recording head portion has a stacked structure including a magnetic pole layer extending rearward from the recording-medium-facing surface, having a track width specifying part which specifies a recording track width of the recording medium, and executing a recording process, in the second step, the first resistance film pattern is formed so as to be disposed in the same level as that of the magneto-resistive effect device in the reproducing head portion, and in the third step, the second resistance film pattern is formed so as to be disposed in the same level as that of the magnetic pole layer in the recording head portion.

14. A method of manufacturing a thin film magnetic head structure according to claim 13, wherein in the second step, the first resistance film pattern is formed so as to be able to grasp a polishing amount of the reproducing head portion so that the dimension of the magneto-resistive effect device in the extension direction of the magneto-resistive effect device becomes a predetermined dimension, and in the third step, the second resistance film pattern is formed to be used to grasp a polishing amount of the recording head portion so that the dimension of the track width specifying part in the extension direction of the magnetic pole layer becomes a predetermined dimension.

15. A method of manufacturing a thin film magnetic head structure according to claim 13, wherein in the second step, the first resistance film pattern is formed in parallel with the magneto-resistive effect device, and in the third step, the second resistance film pattern is formed in parallel with the magnetic pole layer.

16. A method of manufacturing a thin film magnetic head structure according to claim 15, wherein the third step includes the steps of:

forming a seed layer for making a plating film grown;

pattern-forming the magnetic pole layer and forming a dummy pattern for forming the second resistance film pattern by making a plating film selectively grown on the seed layer;

selectively etching and removing the seed layer by using both of the magnetic pole layer and the dummy pattern as a mask, thereby making the seed layer remain only in regions corresponding to the shapes of the magnetic pole layer and the dummy pattern; and removing the dummy pattern, thereby using the seed layer remaining in the region corresponding to the shape of the dummy pattern as the second resistance film pattern.

17. A method of manufacturing a thin film magnetic head using a thin film magnetic head structure, comprising:

a first step of forming a plurality of thin film magnetic head bars each including a plurality of thin film magnetic head precursors, a plurality of first resistance film patterns used to control progress of a polishing process on the reproducing head portion, and a plurality of second resistance film patterns used to control progress of a polishing process on the recording head portion by cutting the thin film magnetic head structure along a direction of arrangement of a plurality of thin film magnetic head precursors; and a second step of forming the thin film magnetic head so as to have both of the reproducing head portion and the recording head portion and also a recording-medium-facing surface by forming the recording-medium-facing surface by polishing the thin film magnetic head precursor together with a substrate in the thin film magnetic head bar, while detecting a first electric resistance value between the first resistance film patterns or between the second resistance film patterns and a second electric resistance value between the first resistance film pattern and the second resistance film pattern, and controlling progress of the polishing process on the basis of the first and second resistance values.

18. A method of manufacturing a thin film magnetic head according to claim 17, wherein in the second step, the thin film magnetic head bar is polished while grasping the polishing amount on the basis of a change in each of the first electric resistance value and the second electric resistance value according to the polishing amount.

19. A method of manufacturing a thin film magnetic head according to claim 17, wherein in the first step, the thin film magnetic head precursor in which the reproducing head portion has a stacked structure including a magneto-resistive effect device extending rearward from the recording-medium-facing surface and executing a reproducing process, and the recording head portion has a stacked structure including a magnetic pole layer extending rearward from the recording-medium-facing surface, having a track width specifying part which specifies a recording track width of the recording medium, and executing a recording process is used, and in the second step, on the basis of the first and second electrical resistance values, the reproducing head portion is polished so that the dimension of a magneto-resistive effect device in the extension direction of the magneto-resistive effect device becomes a predetermined dimension, and the recording head portion is polished so that the dimension of the track width specifying part in the extension direction of the magnetic pole layer becomes a predetermined dimension.

20. A method of manufacturing a thin film magnetic head according to claim 19, wherein the second step comprises the steps of:

pre-polishing the thin film magnetic head bar so that the dimension of a magneto-resistive effect device in the extension direction of the magneto-resistive effect device becomes a pre-dimension larger than a target dimension on the basis of the first electrical resistance value;

adjusting a tilt of a polished surface of the thin film magnetic head bar while maintaining the pre-dimension on the basis of the first and second electrical resistance values; and finish-polishing the thin film magnetic head bar so that the dimension of the magneto-resistive effect device in the extension direction of the magneto-resistive effect device becomes the target dimension from the pre-dimension on the basis of the first electrical resistance value.

* * * * *